US005659790A

United States Patent [19]
Kim et al.

[11] Patent Number: 5,659,790
[45] Date of Patent: Aug. 19, 1997

[54] SYSTEM AND METHOD FOR GLOBALLY SCHEDULING MULTIMEDIA STORIES

[75] Inventors: Michelle Yoonkyung Kim; Junehwa Song, both of Scarsdale, N.Y.

[73] Assignee: International Business Machines Corporation, Armonk, N.Y.

[21] Appl. No.: 392,701

[22] Filed: Feb. 23, 1995

[51] Int. Cl.⁶ ...................................................... G06F 15/00
[52] U.S. Cl. ........................... 395/806; 395/175; 395/762
[58] Field of Search .................................... 395/152, 153, 395/154, 160, 148, 159, 173, 174, 175, 327, 328, 348, 349, 762, 806, 807; 364/148, 153, 976.5, 977.5

[56] References Cited

U.S. PATENT DOCUMENTS

| | | | |
|---|---|---|---|
| 5,515,490 | 5/1996 | Buchanan et al. | 395/154 |
| 5,526,480 | 6/1996 | Gibson | 395/154 |
| 5,528,513 | 6/1996 | Vaitzblit et al. | 364/514 A |
| 5,537,528 | 7/1996 | Takahashi et al. | 395/154 |
| 5,563,649 | 10/1996 | Gould et al. | 348/17 |

OTHER PUBLICATIONS

Buchanan et al., "Automatic Temporal Layout Mechanisms", *ACM Multimedia* 93, Jun. 1993, pp. 341-350.

Buchanan et al., "Scheduling Multimedia Documents Using Temporal Constraints", Proceedings of the Third International Workshop on Network and Operating System Support for Digital Audio and Video, Nov. 1992, pp. 1-13.

Buchanan et al., "Specifying Temporal Behavior in Hypermedia Documents", Proceedings of the European Conference on Hypertext, Dec. 1992, pp. 1-10.

Dechter, et al., "Temporal Constraint Networks", Artificial Intelligence 49, (1991) pp. 61-95.

*Primary Examiner*—Mark K. Zimmerman
*Assistant Examiner*—Stephen Hong
*Attorney, Agent, or Firm*—Whitham, Curtis, Whitham & McGinn; Louis J. Percello, Jr.

[57] ABSTRACT

A multimedia system represents multimedia objects as ranges of time intervals, each bounded by a minimum and a maximum, and temporal relationships are given to a set of objects which are to be integrated. In this system, where there are uncertainties in time, a stretchable time-line is provided. The stretchable time-line is modeled after a spring system such that an object (or a spring) is associated not only with a minimum and a maximum length but also with a length at rest. As a spring rests at a certain length and stretches and shrinks by a certain degree when a force is applied, multimedia objects placed on the stretchable timeline may also rest at a certain length, and stretch or shrink if necessary. As a spring has a tendency to return to the length at rest, a multimedia object may stretch or shrink when necessary and by a smallest degree possible. The system according to the invention can answer a question like, "Can I show this multimedia presentation in ten minutes, and if so, how should all the objects be scheduled?" If there is a solution that satisfies all the constraints given, the solution consists of a set of time intervals which "minimally" deviate from the corresponding lengths at rest and also evenly distribute the variation of the difference between the optimum duration and the scheduled duration for each episode.

3 Claims, 25 Drawing Sheets

TABLE : CONNECTION OF MULTIMEDIA OBJECTS.

| TO / FROM | obj 1 | obj 2 | • • • | obj n | dummy 1 | • • • | dummy m |
|---|---|---|---|---|---|---|---|
| obj 1 | 0 | 1 | | | 1 | | |
| obj 2 | 0 | 0 | | 1 | | | |
| • • • | | | | | | | |
| obj n | | | | | | | |
| dummy 1 | 1 | | | | | | |
| • • • | | | | | | | |
| dummy 2 | | | | | | | |

FIG.7

|   | A | B | C | D | E |
|---|---|---|---|---|---|
| A | 0 | 0 | 1 | 0 | 0 |
| B | 0 | 0 | 1 | 0 | 0 |
| C | 0 | 0 | 0 | 1 | 1 |
| D | 0 | 0 | 0 | 0 | 0 |
| E | 0 | 0 | 0 | 0 | 0 |

FIG. 10A

|         | Root | Front1 | Front2 | A | B | C | D | E | Behind1 | Behind2 | Tail |
|---------|------|--------|--------|---|---|---|---|---|---------|---------|------|
| Root    | 0    | /      | /      | 0 | 0 | 0 | 0 | 0 | 0       | 0       | 0    |
| Front1  | 0    | 0      | 0      | / | 0 | 0 | 0 | 0 | 0       | 0       | 0    |
| Front2  | 0    | 0      | 0      | 0 | / | 0 | 0 | 0 | 0       | 0       | 0    |
| A       | 0    | 0      | 0      | 0 | 0 | / | 0 | 0 | 0       | 0       | 0    |
| B       | 0    | 0      | 0      | 0 | 0 | / | 0 | 0 | 0       | 0       | 0    |
| C       | 0    | 0      | 0      | 0 | 0 | 0 | / | / | 0       | 0       | 0    |
| D       | 0    | 0      | 0      | 0 | 0 | 0 | 0 | 0 | /       | 0       | 0    |
| E       | 0    | 0      | 0      | 0 | 0 | 0 | 0 | 0 | 0       | /       | /    |
| Behind1 | 0    | 0      | 0      | 0 | 0 | 0 | 0 | 0 | 0       | 0       | /    |
| Behind2 | 0    | 0      | 0      | 0 | 0 | 0 | 0 | 0 | 0       | 0       | /    |
| Tail    | 0    | 0      | 0      | 0 | 0 | 0 | 0 | 0 | 0       | 0       | 0    |

FIG. 10B

Procedure    FORWARDPATH ( N )

1. $S = |Path(N)|$

2. For i from 1 to S do
   Path ( N, i ) = Append ( Path(N, i), <N>)

3. Let N' be the Child of N
   Path ( N' ) = Path(N) ∪ Path(N')

(Example)

Procedure   SPLITPATH ( N )

1.   S = | Path ( N ) |

2.   For i from 1 to S do
     Path ( N, i ) = Append ( Path(N, i), N)

3.   For Each Child N' of N do
     Path ( N' ) = Path(N) {<N>} U Path(N')

Procedure    GENERATE_EQUATIONS ( N )

1.    S = | Path ( N ) |

2.    For i from 1 to S−1 do 2-1.    For j from i to S do 2-1-1.    If Head (Path(N,i)) = Head (Path(N,j))
Then $$\text{Generate } "\sum_{X \in Path(N,i)} X = \sum_{X' \in Path(N,j)} X'"$$

Go to Step 2
End (Example)

Path (N, i) = $\langle X_0 X_1 \rangle$
Path (N, i+1) = $\langle X_0 X_2 \rangle$
Path (N, i+2) = $\langle X_0 X_3 X_4 \rangle$

⇓

$X_1 = X_2$
$X_2 = X_3 + X_4$

SYSTEM AND METHOD FOR GLOBALLY SCHEDULING MULTIMEDIA STORIES

BACKGROUND OF THE INVENTION

1. Field of the Invention

The present invention generally relates to composing and playing multimedia documents with variable play times on a computer system and, more particularly, to composing and playing multimedia episodes in multimedia documents so that they are presented correctly in time when the document play time is varied.

2. Background Description

Electronic multimedia documents have become a popular media for storing multimedia documents such as encyclopedias and the like since this media is capable of storing a large amount of data, including text, graphics, action video, sound, and the like, which when combined form a multimedia document. The user of a multimedia document typically presents or receives multimedia information called fragments, segments, or multimedia objects, hereinafter called episodes, through the computer input or output, respectively. Generally, these multimedia episodes include information having a sensory quality that can take the form of audio and visual information like audio and video clips, musical recordings, speech, typed text, still picturers, drawings, animation, choreographed dance steps, and the like.

Episodes that are presented as output of the computer are said to be "played". A visual output is played as a display, and an audio output is played as sound, sometimes accompanying a display. To compose or play a multimedia document, the computer user must select one or more episodes and play them in a particular order, and the order may be sequential, simultaneous or overlapping. Multimedia documents are called stories when they have related episodes that are organized and/or played with some sort of temporal constraints.

While composing or playing stories with a few number of episodes may be relatively easy, some prior art methods are incapable of composing or playing stories with a very large number of episodes. In addition, some prior art methods do not provide a way to schedule episodes that may be played in a variable time duration. Those prior art methods that do provide a way to schedule episodes of variable play time do not permit a user to constrain the global play time; i.e., the time that the entire story takes to play. Further, the prior art does not evenly distribute the variation of the difference between the optimal episode play time and the scheduled episode play time during the playing of the story.

SUMMARY OF THE INVENTION

It is therefore an object of the present invention to provide an improved method and apparatus for composing and playing multimedia episodes.

It is another object of the invention to provide an improved method and apparatus for playing multimedia stories with a variable global play time.

It is a further object of the invention to provide an improved method and apparatus for identifying the variability of global play time for multimedia stories and providing a user the ability to choose a global play time.

It is yet another object of the invention to provide an improved system and method for choosing a global play time of a story from a plurality of global play times and for scheduling episode play times fairly within the story.

According to the invention, there is provided a multimedia system in which multimedia objects are represented as ranges of time intervals, each bounded by a minimum and a maximum, and temporal relationships are given to a set of objects which are to be integrated. In such a system, where there are uncertainties in time, a stretchable time-line is provided. The stretchable time-line is modeled after a spring system such that an object (or a spring) is associated not only with a minimum and a maximum length but also with a length at rest. As a spring rests at a certain length and stretches and shrinks by a certain degree when a force is applied, multimedia objects placed on the stretchable time-line may also rest at a certain length, and stretch or shrink if necessary. As a spring has a tendency to return to the length at rest, a multimedia object may stretch or shrink when necessary and by a smallest degree possible. The system according to the invention can answer a question like, "Can I show this multimedia presentation in ten minutes, and if so, how should all the objects be scheduled?" If there is a solution that satisfies all the constraints given, the solution consists of a set of time intervals which "minimally" deviate from the corresponding lengths at rest, and also the variations of difference between the optimal length (length at rest) and given time interval (scheduled duration) are evenly distributed.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is an example of a temporal constraint table used to determine constraints of sets of paths with equal play time;

FIGS. 10A and 10B are temporal constraint tables corresponding to the temporal constraint graphs of FIGS. 9A and 9B;

DETAILED DESCRIPTION OF A PREFERRED EMBODIMENT OF THE INVENTION

Figure 1:
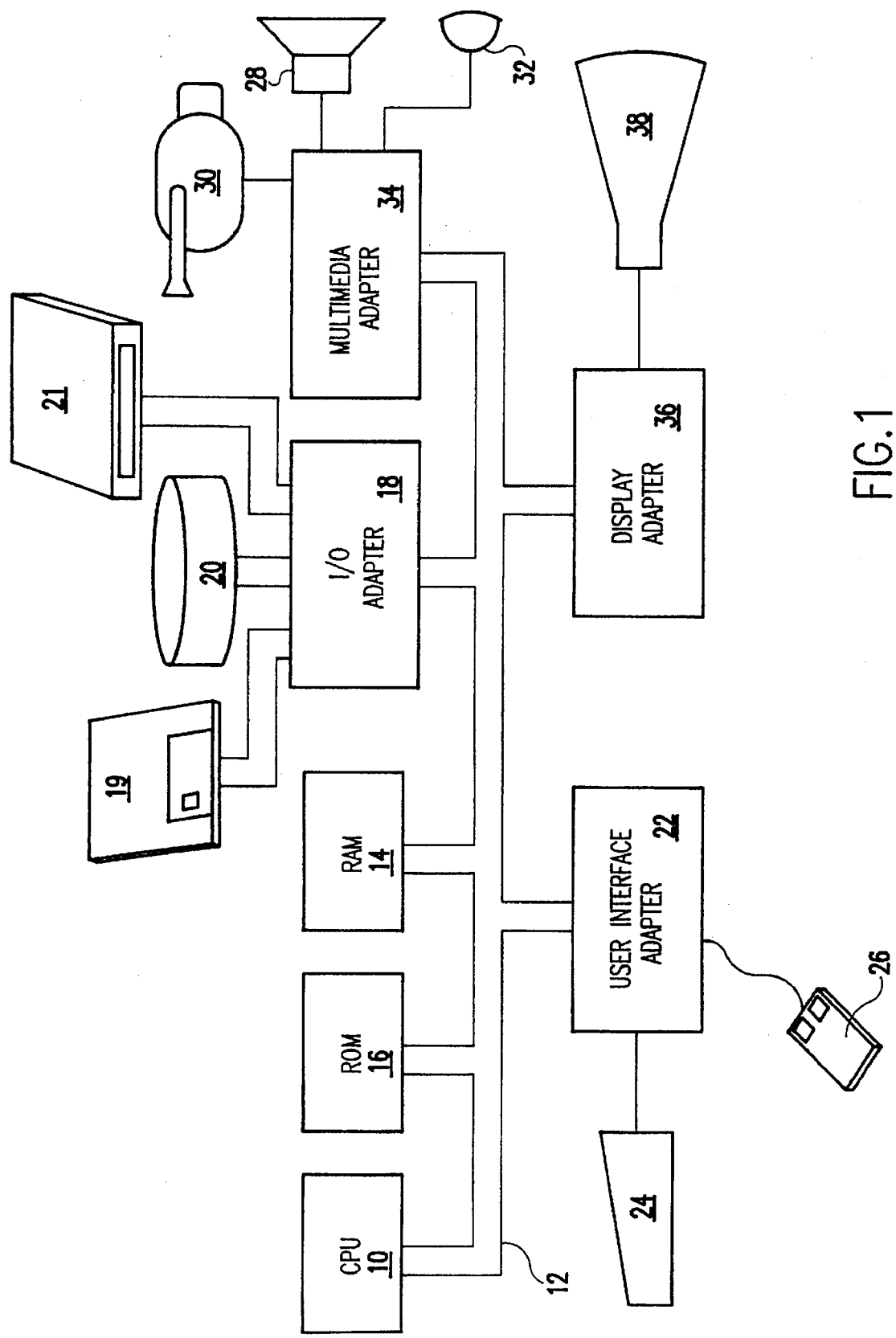
FIG. 1 is a block diagram showing a hardware configuration on which the subject invention may be implemented.

Referring now to the drawings, and more particularly to FIG. 1, there is shown a representative hardware environment which may be a personal computer, such as the International Business Machines (IBM) Corporation's Personal System/2 (PS/2) family of Personal Computers. The hardware includes a central processing unit (CPU) 10, which may conform to Intel's X86 architecture or may be a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a floppy drive 19, a hard disk drive 20 and a CD-ROM 21. The hard disk drive 20 typically stores the computer's operating system (OS), such as IBM's OS/2 operating system, and various application programs, each of which are selectively loaded into RAM 14 via the system bus 12. The user interface adapter 22 has attached to it a keyboard 24, a mouse 26, and/or other user interface devices (not shown).

The personal computer or workstation also includes a display 38, here represented as a cathode ray tube (CRT) display but which may be a liquid crystal display (LCD) or other suitable display. The display 38 is connected to the system bus 12 via a display adapter 36. A multimedia adapter 34, such as Intel Corporation's ActionMedia II Display Adapter, is connected to the bus 12 and to a microphone 32, a speaker 28 and a video camera 30 for audio/video capture and playback. The multimedia adapter 34 is supported by suitable software, such as IBM's Multimedia Presentation Manager/2. As will be understood by those skilled in the art, other multimedia hardware and software may be incorporated into the system, including but not limited to video cassette recorders (VCRs), laser disk players, surround sound processors, and the like.

In the practice of the invention, multimedia objects in a story are viewed as defining time intervals over which they play. It is useful to be able to deal with a range of time intervals bounded by a minimum and a maximum. For instance, a video segment may be played at a rate of 30 frames/second, or perhaps a bit slower or a bit faster. Similarly, audio segments, graphics animation, text segments, or still frames may be associated with a range of acceptable speeds and play duration at which they can be presented. Depending on the constraints that are given, an appropriate speed may be selected for each segment. This is where stretchability comes in. Intuitively, consider mapping the presentation onto a time-line that is stretchable (or shrinkable). To use an analogy, imagine a multimedia presentation consisting of a set of springs connected according to relationships that are given. Using this analogy, each multimedia object is associated with a triple of lengths, a minimum length, corresponding to the compressed length of the spring, a maximum length, corresponding to the stretched length of the spring, and an optimum length, corresponding to the spring at rest.

A multimedia story is composed by selecting among a list of episodes. Each episode must have associated with it the triple of lengths just described. This is done, for example, using the user interactive screen shown in FIG. 2. From the list of episodes, an episode is selected. The selected episode is graphically represented in the upper left corner of the screen by the icon 201. Using a pointing cursor, the user selects one of the lengths of the triple by clicking on one of the buttons 202, 203 or 204 for "min", "opt" or "max", respectively. Then, clicking on and dragging the slider 205 in the time line 206, the user sets the time. In the example illustrated, the user has selected the button 203 for "opt" and set the slider 205 at ten seconds. Alternatively, the user can type in the time in window 207. The time shown in the window 207 and the slider 205 are linked such that as the slider is moved, the value displayed in the window changes and vice versa; that is, typing a value in the window 207 will result in the slider 205 moving to that value. When the user is satisfied with the value for the selected length, the "set" button 208 is selected, and when the user has selected all three lengths of the triple, the "done" button 209 is selected. At any time in the process before selecting the "done" button 208, the "cancel" button 210 may be selected to abort the process. The example illustrated shows that the minimum length selected is two seconds and the maximum length selected is 19.9 seconds. Arrow buttons 211 and 212 at the end of the time line 206 may be used to incrementally move the slider 205 step-by-step. Note that the while the time line extends from zero to twenty seconds, it may be extended or contracted by selecting an appropriate one of the arrow buttons 213 or 214 in the lower corners of the window, thus accommodating a wide variety of time periods for various episodes which make up a story.

Figure 2:
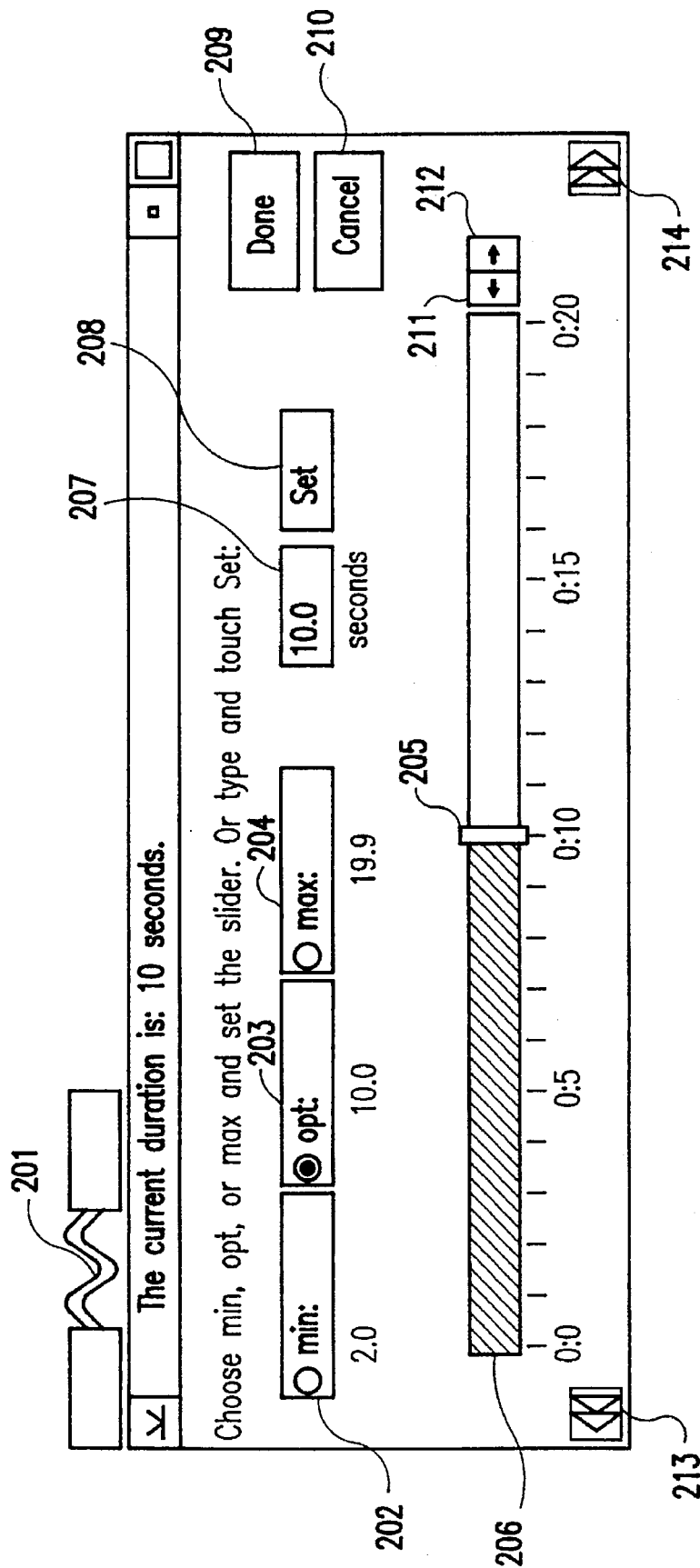
FIG. 2 is an illustration of a computer screen for inputting minimum, optimum and maximum play time duration for episodes of a multimedia story.

The user interactive screen shown in FIG. 2 is but one example that may be used in setting the triple of lengths for each episode in the list of episodes. Other techniques may be used. It is only necessary that the triple of lengths for each episode be input to the system.

Generally speaking, multimedia authoring is a process of ordering, or integrating, multimedia objects, such as video segments, images, graphics, audio segments, or text segments. A set of multimedia objects to which a certain ordering has been given is called a story. Ordering of objects with respect to a story may be done both in a temporal dimension and in a spatial dimension. This invention is specifically concerned with the problem of obtaining a temporal layout, or ordering multimedia objects in the temporal dimension. Time is an essential dimension in a multimedia system. It often provides the basic measure for multimedia objects. Time also provides a reference to interrelate various multimedia objects. Reasoning about time has been the focus of much research activities within the field of artificial intelligence (AI), and many formalisms have been proposed for temporal reasoning.

Figure 3A:
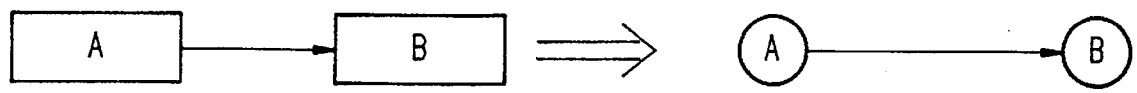
FIGS. 3A to 3D, inclusive, are block diagrams showing examples of four types of temporal constraints.
Figure 3B:
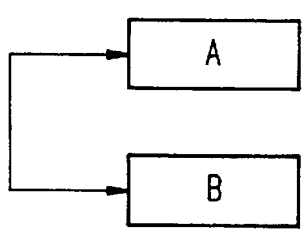
Figure 3C:
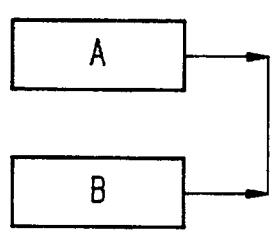
Figure 3D:
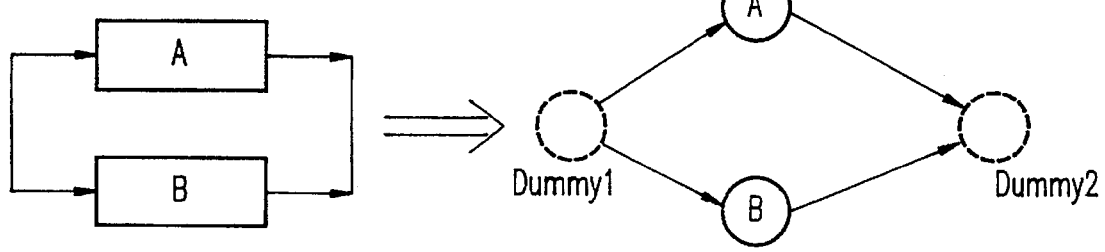

The invention uses a set of multimedia segments/objects that may or may not have a relationship to one another. A subset of these segments, to be used in a story, are selected. The selected segments are called episodes of the story. The episodes in a story are then scheduled together in a way that defines the story. This scheduling can be represented in a temporal layout. The temporal layout has temporal constraints. FIGS. 3A to 3D show examples of four types of temporal constraints. In FIG. 3A, two episodes, A and B, represented by rectangular boxes, are sequentially scheduled so that at the end of episode A, episode B is scheduled to begin. This temporal constraint is termed "meet(A,B)". The equivalent temporal constraint graph is node A connecting to node B via an arrow pointing from node A to node B. In FIG. 3B, episodes A and B are scheduled to begin simultaneously. This temporal constraint is termed "cobegin(A,B)". The temporal constraint graph is a dummy node, shown in dotted line, connected to both nodes A and B via respective arrows pointing to nodes A and B. In FIG. 3C, episodes A and B are scheduled to end simultaneously. This temporal constraint is termed "coend(A,B)". The temporal constraint graph is nodes A and B connected to a dummy node via respective arrows pointing to the dummy node. In FIG. 3D, episodes A and B are scheduled to both begin and end simultaneously. This temporal constraint is termed "co-occur(A,B)". The temporal constraint graph is a combination of the temporal constraint graphs for "cobegin(A,B)" and "coend(A,B)".

Figure 4:
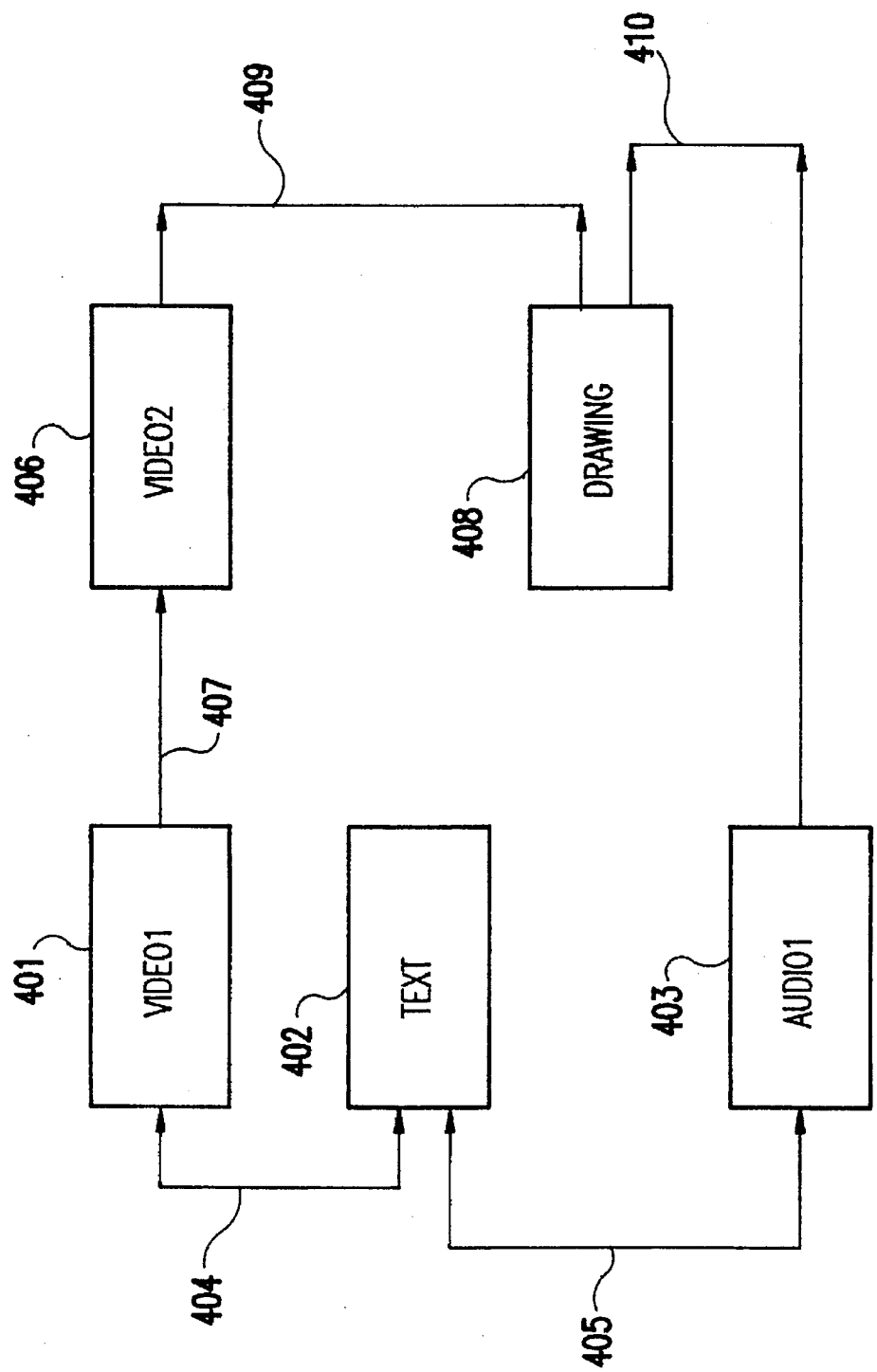
FIG. 4 is a block diagram showing an example of a graphic representation of episodes in a story and their temporal constraints.

FIG. 4 is an example of story having multiple episodes occurring at various times and with differing time durations. Three episodes 401, 402 and 403, identified as "video 1", "text" and "audio 1", respectively, begin simultaneously, as in FIG. 3B. The temporal relations are indicated at 404 as "cobegin(video1,text)" and at 405 as "cobegin(text,audio1)". Episode 406, identified as "video 2", begins after episode 401 ends, as in FIG. 3A. The temporal relation is "meet(video1,video2)", as indicated at 407. A fifth episode 408, identified as "drawing" occurs during episode 406 and ends with that episode, as in FIG. 3C. The temporal relation indicated at 409 is "coend(video2,drawing)". The third episode 403 also ends with episodes 406 and 408. The temporal relation indicated at 410 is "coend(drawing, audio1)". Alternatively, considering episodes 401 and 406 as a combination, the combination of those two episodes and episode 403 begin and end together, as in FIG. 3D. The temporal relation may be represented as "co-occur((video1, video2),audio1)".

Figure 5:
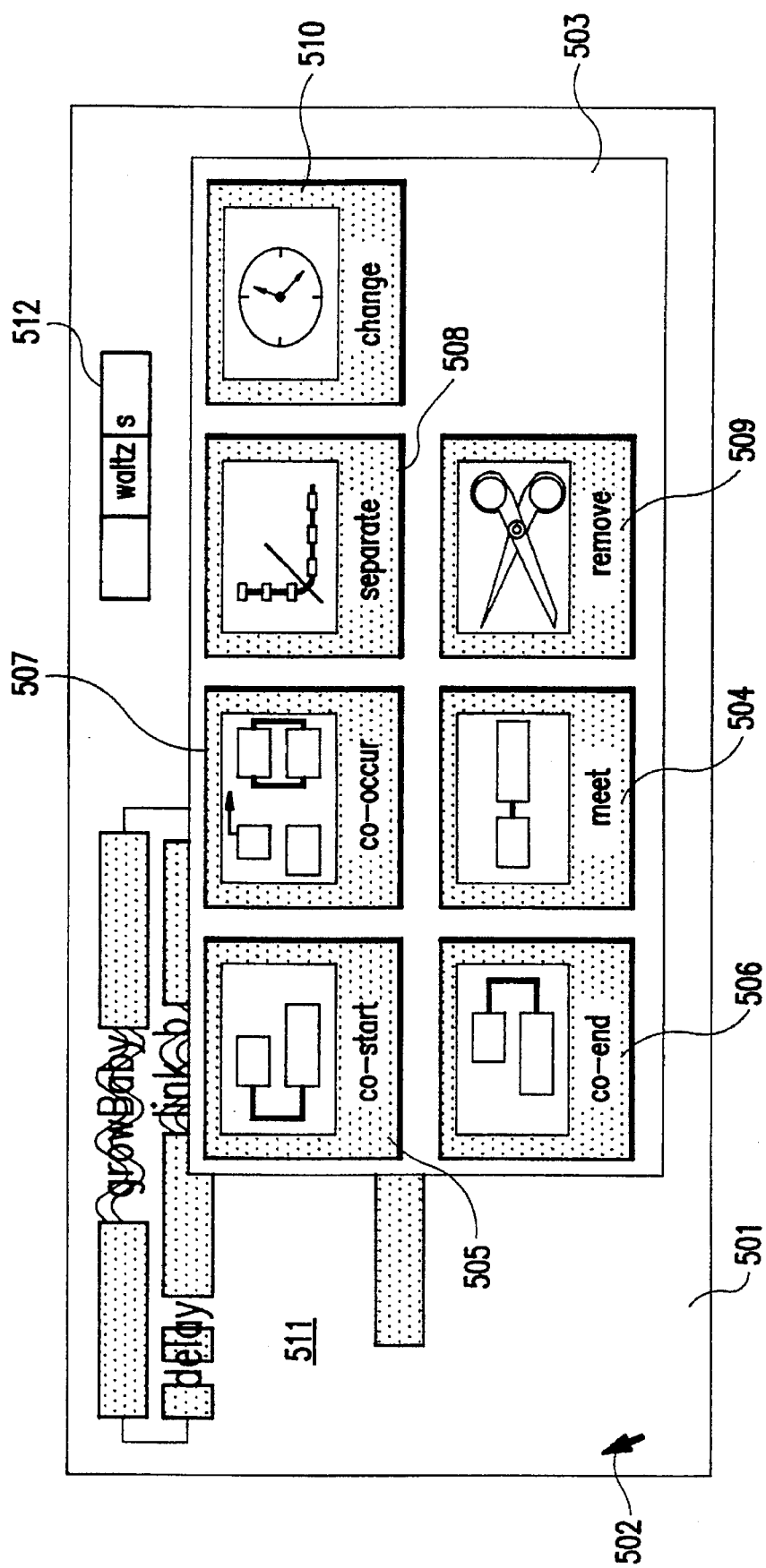
FIG. 5 is an illustration of a computer screen for authoring a story by associating episodes with temporal constraints.

In the practice of the invention, one way that these temporal relations are established is with the user interactive screen shown in FIG. 5. The episodes selected from the list of episodes available for a story are displayed in a "canvas" area 501 of a graphics screen as individual icons. The user selects a pair of episodes icon by clicking on them with a pointing cursor, here shown as an arrow 502. Then, using the buttons in the window 503 opened over the "canvas" area 501, the user selects the desired temporal relation. The four temporal relation buttons are button 504 for the relation "meet", button 505 for the relation "cobegin", button 506 for the relation "coend", and button 507 for the relation "co-occur". Three other buttons are shown in window 503. These are button 508 for separate, button 509 for remove, and button 510 for change. The separate button 508 allows for removing the temporal relation between two episodes in the story, and the remove button 509 allows an episode to be removed from a story. In combination with the temporal relation buttons 504 to 507, the buttons 508 and 509 are the principle editing tools in authoring the multimedia story. The process generates a graphic display on the story "canvas" 501 as generally illustrated at 511. Episodes not yet incorporated into the story, such as the episode represented by icon 512, are shown to the side of the graphical representation of the story as it is being authored by the user. By selecting an episode icon and the change button 510, the screen shown in FIG. 2 is displayed, allowing the user to make changes to the triple of lengths for that episode.

Figure 6A:
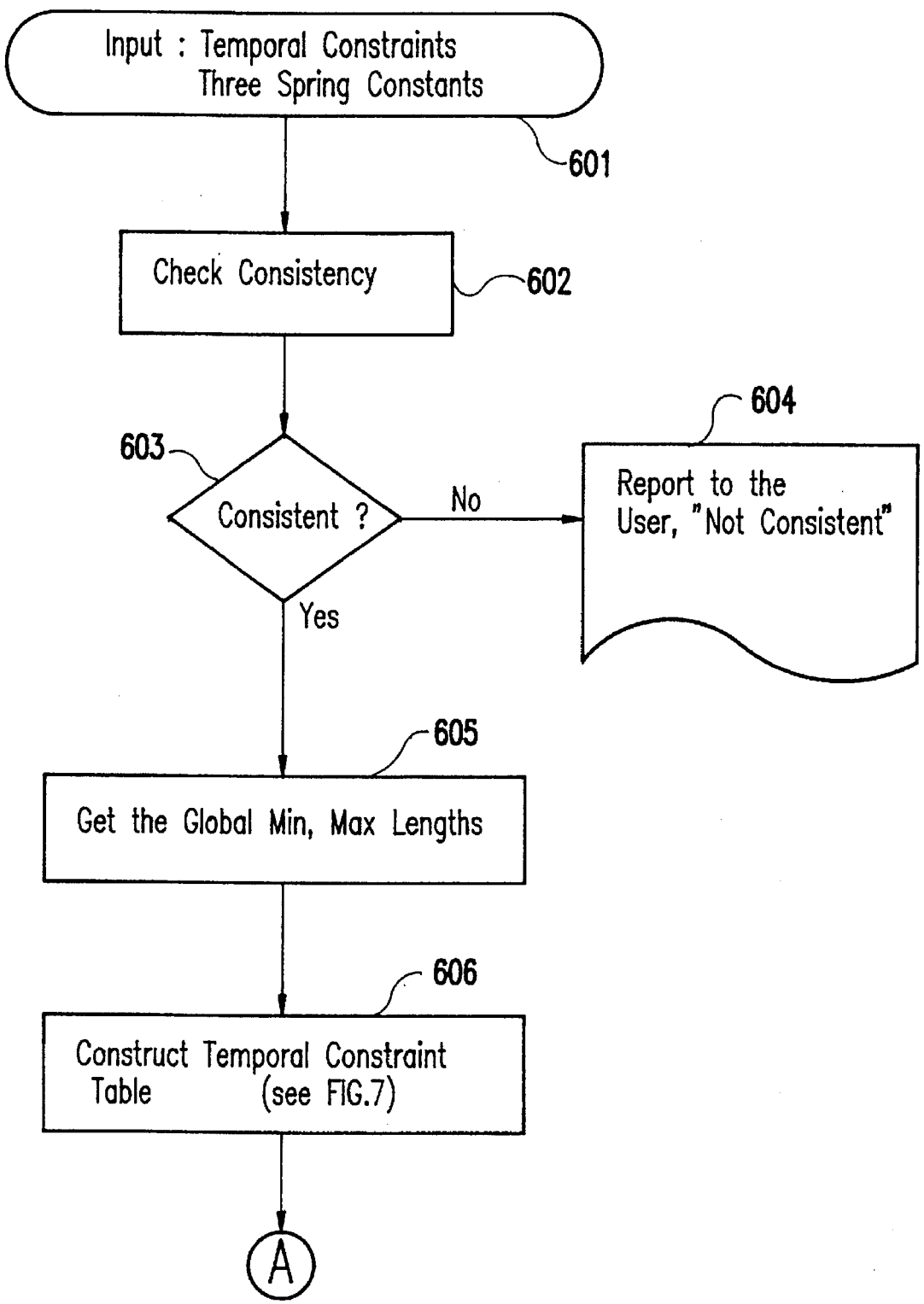
FIGS. 6A, 6B and 6C, taken together, are a flow chart showing the logic of the basic process according to the invention.
Figure 6B:
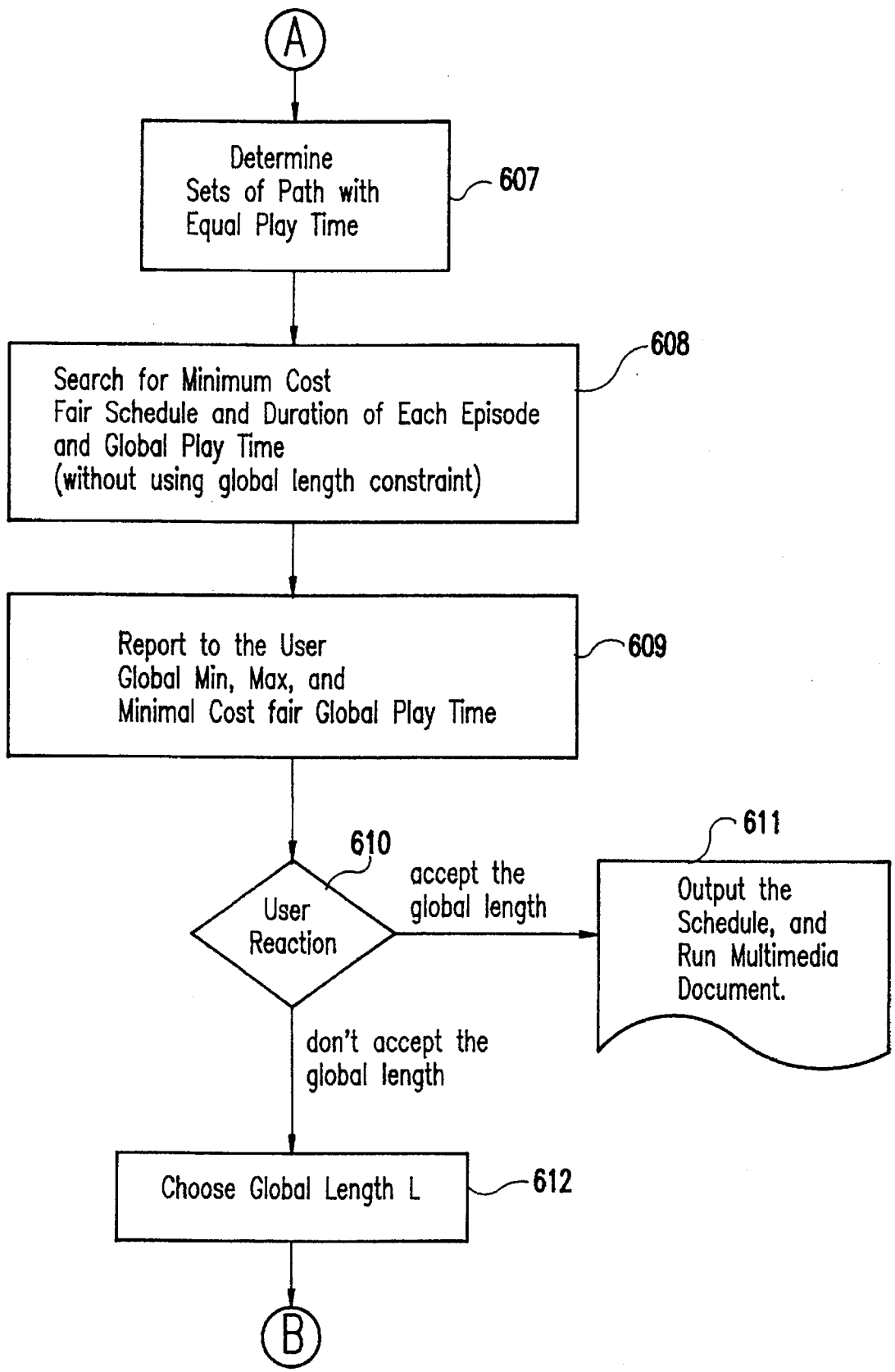
Figure 6C:
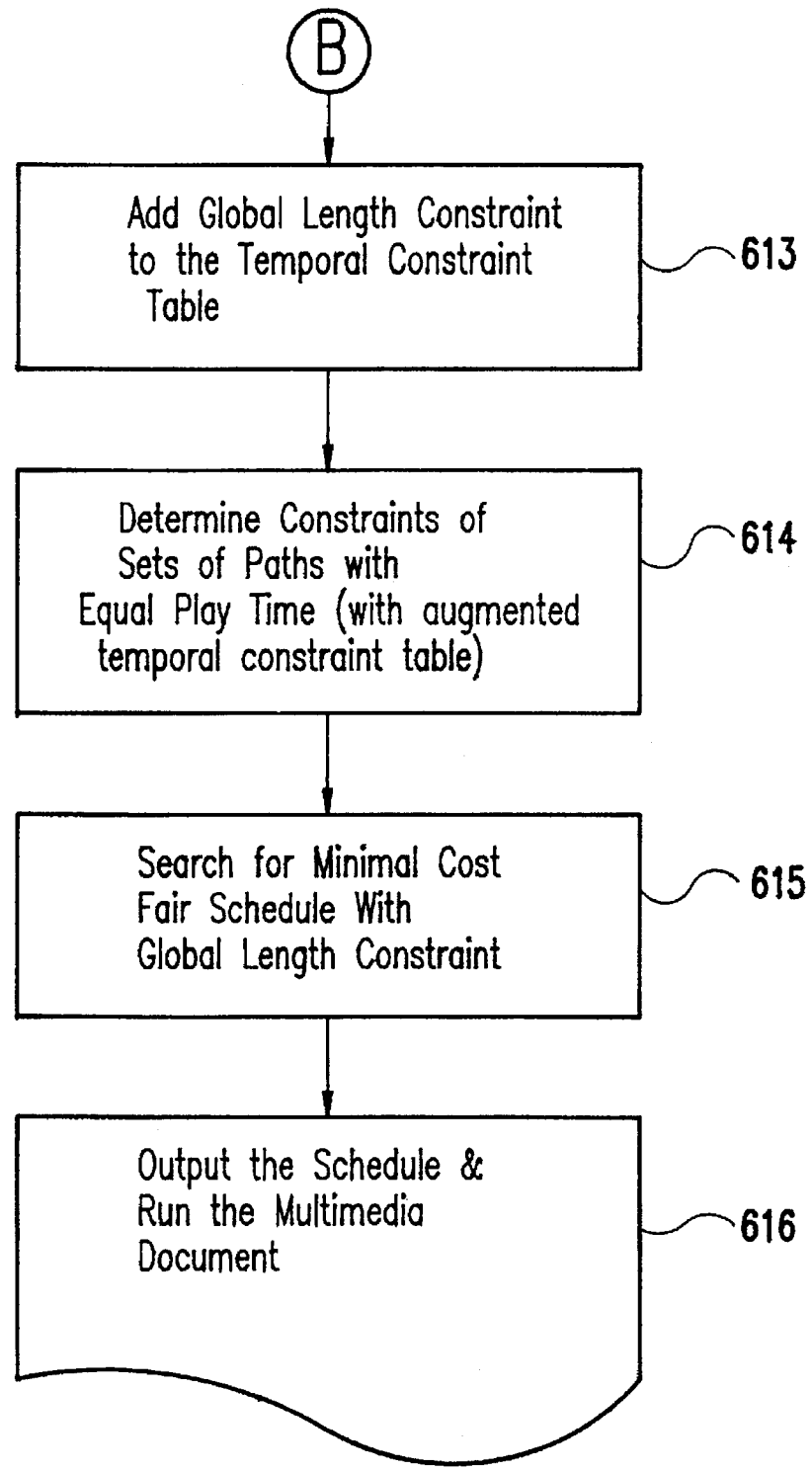

The preferred embodiment of the invention is implemented on a hardware platform such as that generally shown in FIG. 1. FIGS. 6A, 6B and 6C, taken together, are a flow chart showing the logic of the operation of the invention. At this point, the user has authored a multimedia story using editing tools, such as shown in FIG. 5, and it is now desired to adjust the play time of the individual episodes in the story according to the temporal constraints and the three spring constants. The process starts at input block 601 by inputting the temporal constraints and the three spring constants. This is done, for example, using the screens shown in FIGS. 5 and 2, respectively. The inputs are checked for consistency in function block 602. A test is then made in decision block 603 to determine if the inputs are consistent based on the check made in function block 602. If an inconsistency is found, this is reported to the user in output block 604, and the process stops. The process of checking for inconsistencies in temporal constraint networks is described by R. Dechter, I. Meiri and J. Pearl in "Temporal Constraint Networks", *Artificial Intelligence*, 49, 1991, pp. 61–95.

Assuming no inconsistencies have been found, the next step in function block 605 is to get the global minimum and maximum lengths, which is also explained in the above reference to Dechter et al. A temporal constraint table, as shown in FIG. 7, is constructed in function block 606. Using this table, the sets of paths of equal play time are determined in function block 607. The set of equations generated by function block 607 are supplied as an input to function block 608 with the spring constants to generate a minimal cost fair schedule. More particularly, in function block 608, a search is made for minimum cost and fair schedule of each episode and global play time without using the global length constraint. This is done using a known search technique, such as quadratic programming. See, for example, S. Glass, *Linear Programming Methods and Applications*, McGraw-Hill (1975).

The "cost" of an episode play is defined as the difference between the specified optimal play duration of the episode and the scheduled play duration. By the minimal cost schedule, we mean the schedule (i.e., the allocation of play duration to each episode) results in the sum of play cost of each episode becoming minimal over all possible legal assignments of play durations satisfying the temporal constraints as well as minimum and maximum bounds specified. By fair schedule, we mean the distribution of the sum of play costs are even over the episodes. That is, an episode is not played at good quality (i.e., with small play cost) while another is played at a bad quality (i.e., with a large play cost). Rather, a fair schedule makes the two episodes be played at or near the same quality.

The result of the search in function block 608 is the minimal cost and fair play durations for each episode in the story and global play duration. This global play duration (from block 608) and global minimum and maximum (from block 605) is reported to the user in function block 609. The user is prompted in decision block 610 to accept this global play time or to reject it. If the result is accepted, the schedule for the multimedia story is output and the multimedia document is run according to the schedule in output block 611, and the process ends.

A particular feature of the invention is its flexibility which, in this case, allows the user to reject the global length, in which case the user is prompted to input a global length in function block 612 between the global minimum and maximum which was reported in block 609. Then in function block 613, the global length constraint is added to the temporal constraint table. The process is then repeated with this addition to the temporal constraint table. More specifically, the sets of paths with equal play time are determined in function block 614. The set of equations generated by function block 614 is supplied as an input to function block 615 with the spring constants. A search for minimal cost and fair schedule, this time with the global length constraint, is made in function block 615. Then, in output block 616, the schedule is output and the multimedia document is run.

Figure 8A:
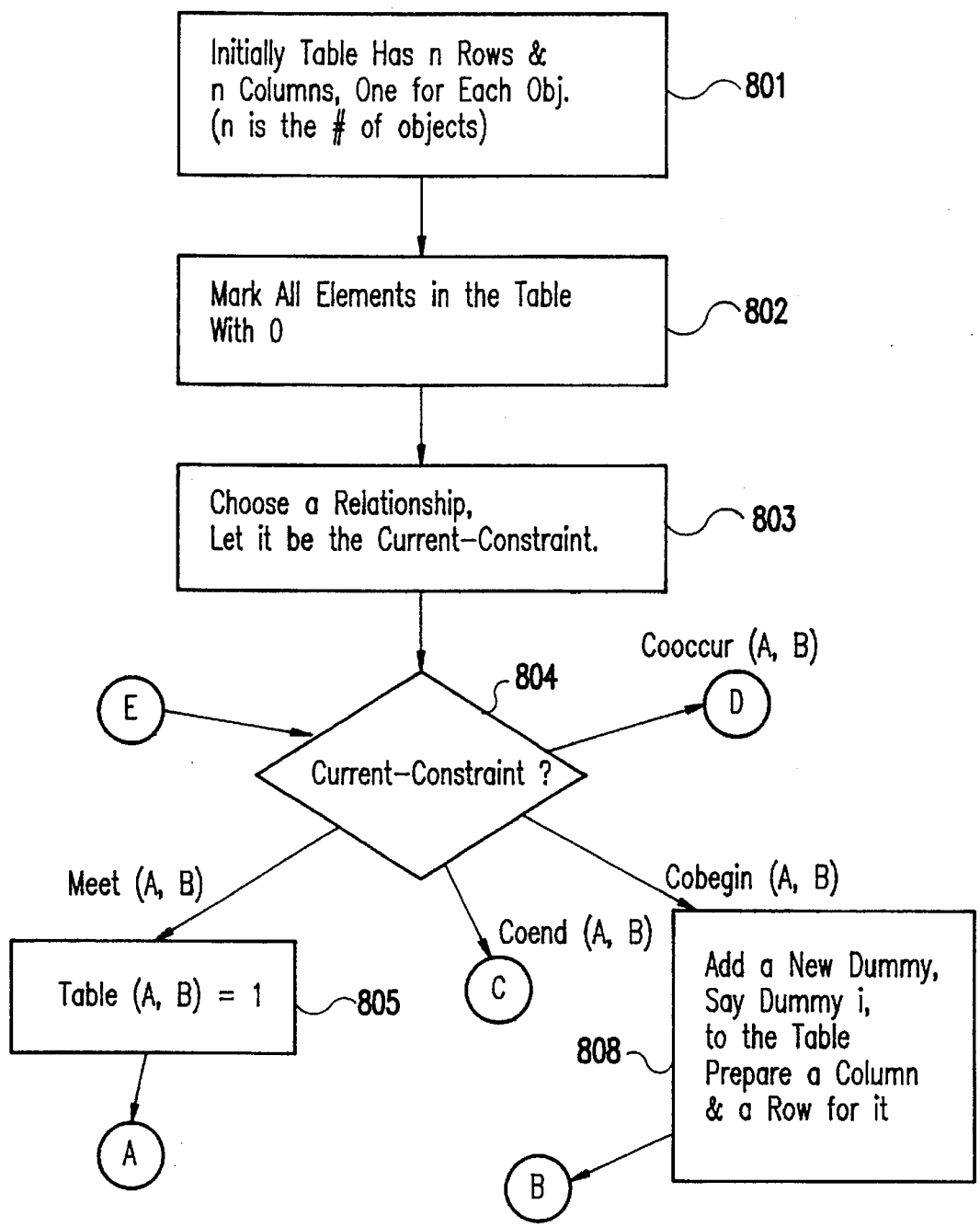
FIGS. 8A, 8B and 8C, taken together, are a flow chart showing the logic of the process of constructing the temporal constraint table of FIG. 7.
Figure 8B:
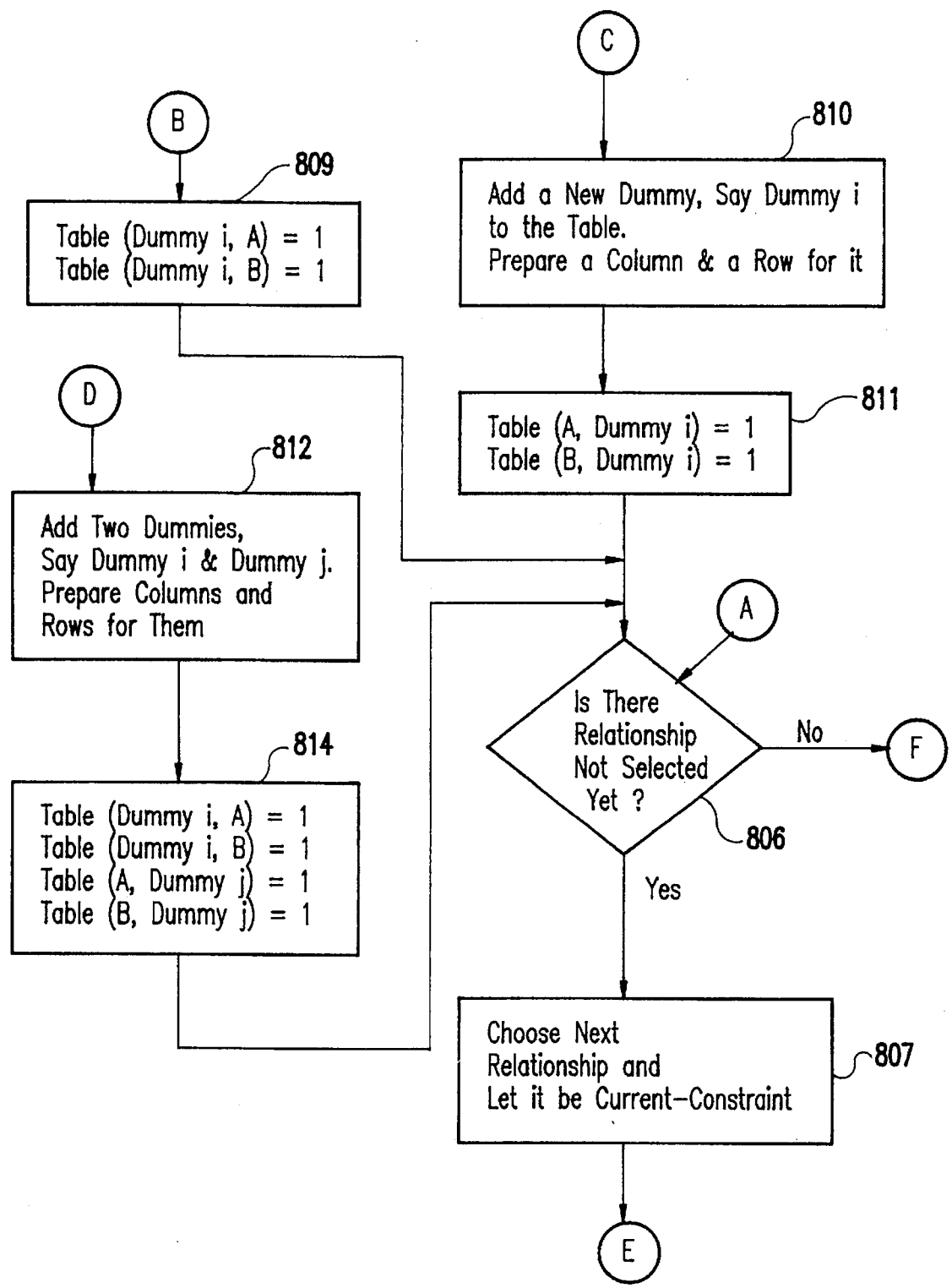
Figure 8C:
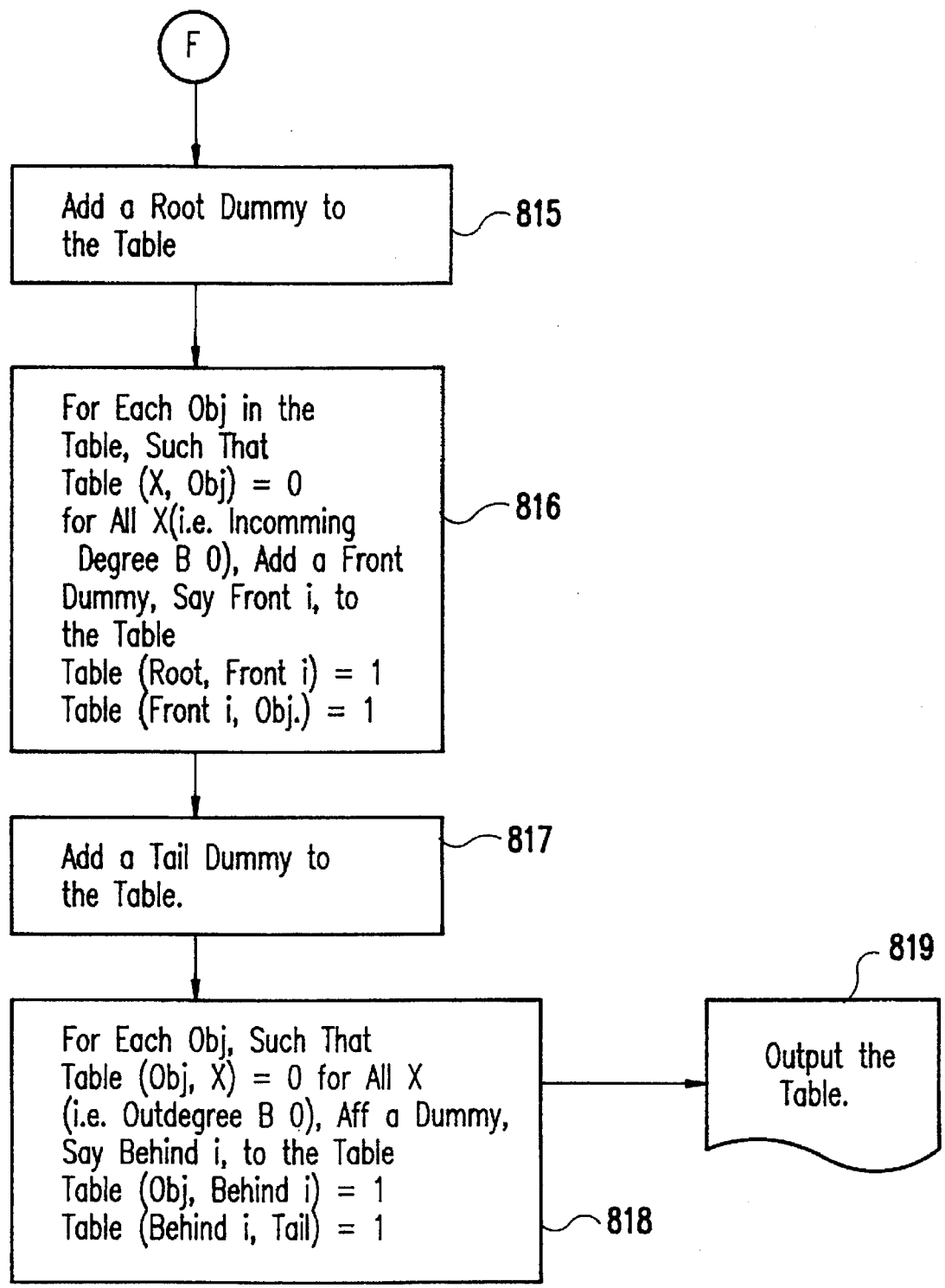

The temporal constraint table shown in FIG. 7 is constructed by the process shown in the flow chart of FIGS. 8A, 8B and 8C. The notation "Table(A,B)=1", where A is a row and B is a column, means that at the end of episode A, episode B starts playing. This procedure is called by function block 606 (and possibly in block 613) shown in FIG. 6 and begins in function block 801 with a table of n rows and n columns, where n is the number of objects or episodes. All elements in the table are marked with a zero in function block 802, and then in function block 803 a relationship is chosen. That is, a pair of episodes (i.e., objects) related by a temporal constraint are chosen. The temporal constraint between the chosen pair is initially the "current constraint". A determination is made in decision block 804 as to which of the four types of temporal constraint is the "current constraint". Based on this decision, the process branches.

If the "current constraint" is "meet(A,B)", then the row for A and the column for B in the temporal constraint table a "1" is entered in function block 805, indicating that episode (object) B occurs after episode (object) A. A test is then made in decision block 806 to determine if there are other relationships remaining to be processed. If so, the next relationship is chosen in function block 807, and the process returns to decision block 804 to determine the type of constraint of this next relationship. If, for example, the constraint is "cobegin(A,B)" the process branches to function block 808, where a dummy node is added to the table by adding, for example, a "dummy1" row and column to the table. See FIG. 7. Then, in function block 809, for row "dummyi", column A, a "1" is entered in the table, indicating that episode (object) A occurs after "dummyi". Similarly, for row "dummyi", column B, a "1" is entered in the table, again indicating that episode (object) B occurs after "dummyi". A test is again made in decision block 806 to determine if there are other relationships remaining to be processed. If so, the next relationship is chosen in function block 807, and the process returns to decision block 804 to determine the type of constraint of this next relationship. If, for example, the constraint is "coend(A,B)" the process branches to function block 810, where again a dummy node is added to the table by adding, for example, a "dummy2" row and column to the table. Then, in function block 811, for row A, column "dummyi", a "1" is entered in the table, indicating that episode (object) A occurs before "dummyi". Similarly, for row B, column "dummyi", a "1" is entered in the table, again indicating that episode (object) B occurs before "dummyi". A test is again made in decision block 806 to determine if there are other relationships remaining to be processed. If so, the next relationship is chosen in function block 807, and the process returns to decision block 804 to determine the type of constraint of this next relationship. If, for example, the constraint is "co-occur(A,B)" the process branches to function block 812. For this temporal constraint, two dummy nodes are added to the table by adding, for example, "dummyi" and "dummyj" rows and columns to the table. Then, in function block 813, for row "dummyi", column A, a "1" is entered in the table, indicating that episode (object) A occurs after "dummyi". Similarly, for row "dummyi", column B, a "1" is entered in the table, again indicating that episode (object) B occurs after "dummyi". For row A, column "dummyj", a "1" is entered in the table, indicating that episode (object) A occurs before "dummyj". Similarly, for row B, column "dummyj", a "1" is entered in the table, indicating that episode (object) B occurs before "dummyj". A test is again made in decision block 806 to determine if there are other relationships remaining to be processed. If not, the process goes to function block 815 where a root dummy is added to the table. Then, in function block 816, for each episode (object) in the table which are not preceded in time by another object, that is, the indgree for that object is zero, a front dummy, say "fronti", is added to the table. Then, a "1" is set in the table at row "root", column "fronti", and another "1" is set in the table at row "fronti", column "obj". In a similar fashion, a tail dummy is added to the table in function block 817, and in function block 818, for each object which is not succeeded by another object, that is, the outdegree is zero, a following dummy, say "behindi", is added to the table. Then, a "1" is set in the table at row "obj", column "behindi", and another "1" is set in the table at row "behindi", column "tail". The completed table is output at output block 819 to be used in the calculations described in the main flow chart of FIGS. 6A to 6D.

Figure 9A:
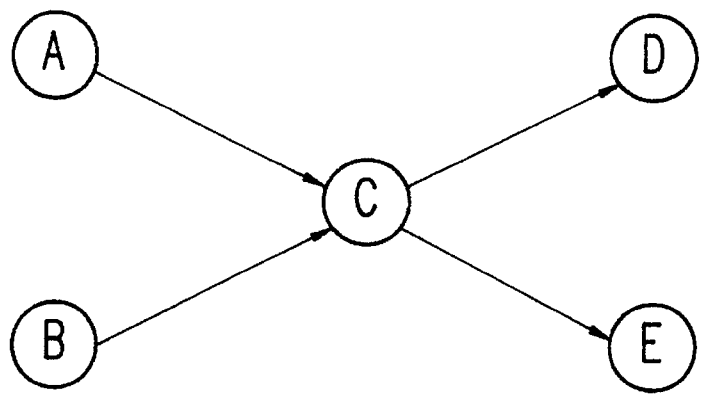
FIGS. 9A and 9B are temporal constraint graphs used to illustrate the process of adding root and tail nodes.
Figure 9B:
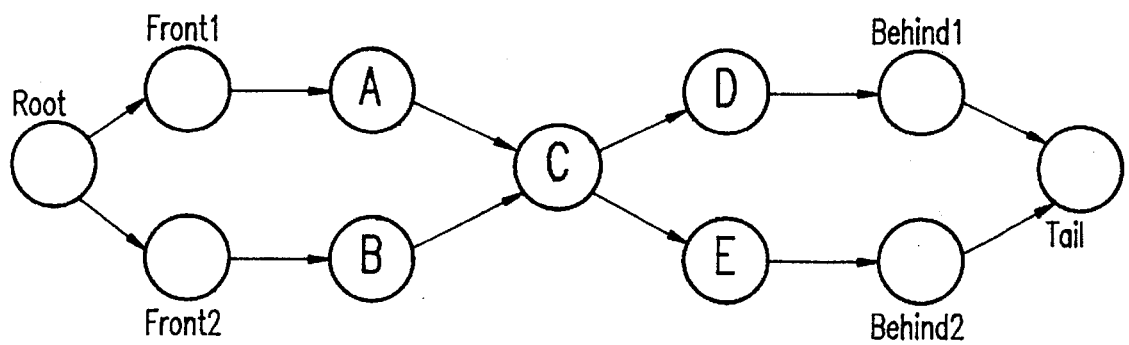

The process just described is perhaps better illustrated by way of an example. Assume that the FIG. 9A is an original temporal constraint graph before the operations in function block 815 et seq. and that FIG. 10A is the temporal constraint table for the graph of FIG. 9A. From the table, it will be observed that episode C begins after episodes A and B and that episodes D and E begin after episode C, corresponding to the temporal constraint graph in FIG. 9A. Now the processes of adding a root dummy, front dummies, a tail dummy and following dummies in function blocks 815 to 818 result in the temporal constraint graph shown in FIG. 9B, corresponding to the temporal constraint table shown in FIG. 10B.

Figure 11A:
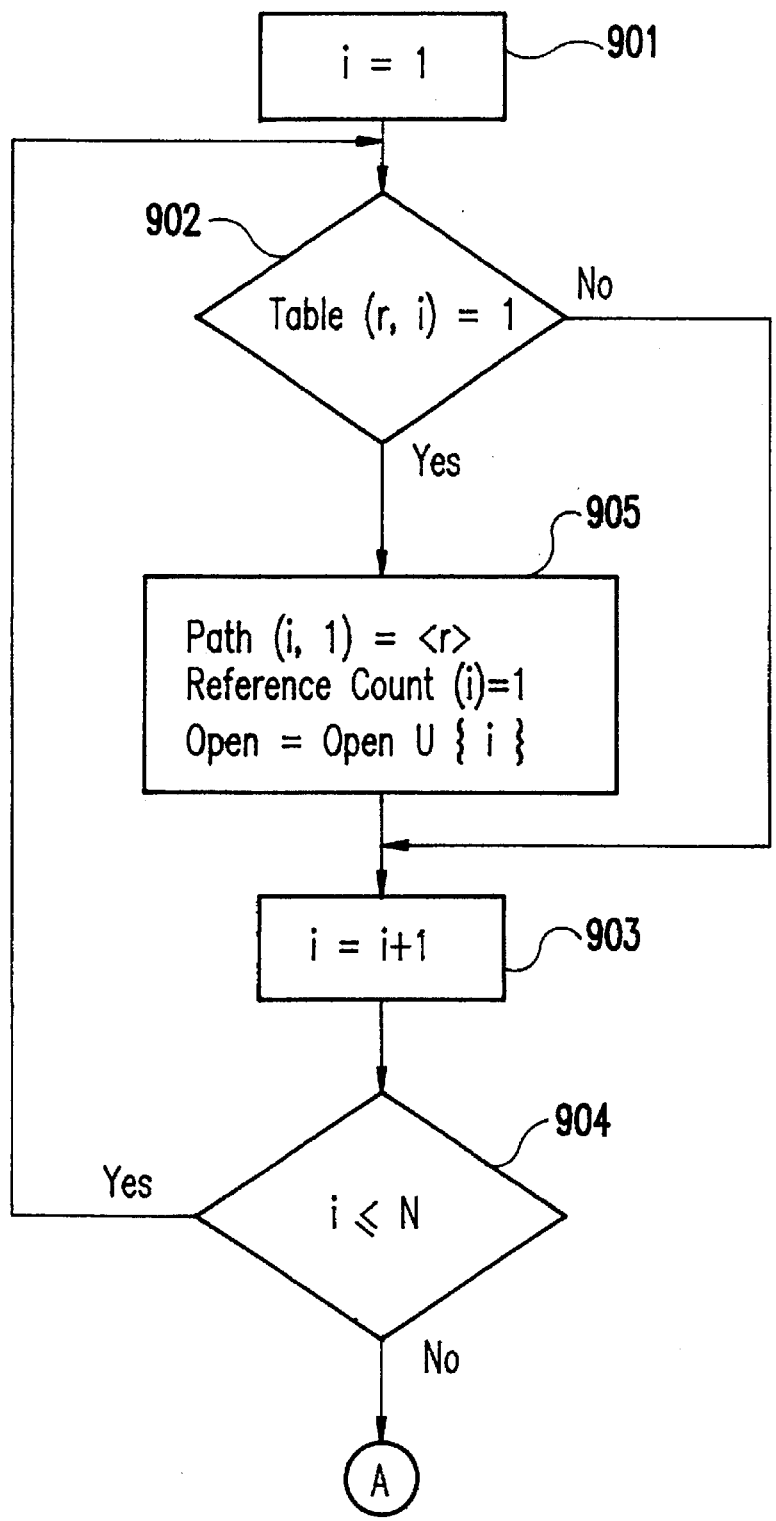
FIGS. 11A, 11B and 11C, taken together, are a flow chart showing the logic of the process for determining from the temporal constraint table sets of paths with equal play time.
Figure 11B:
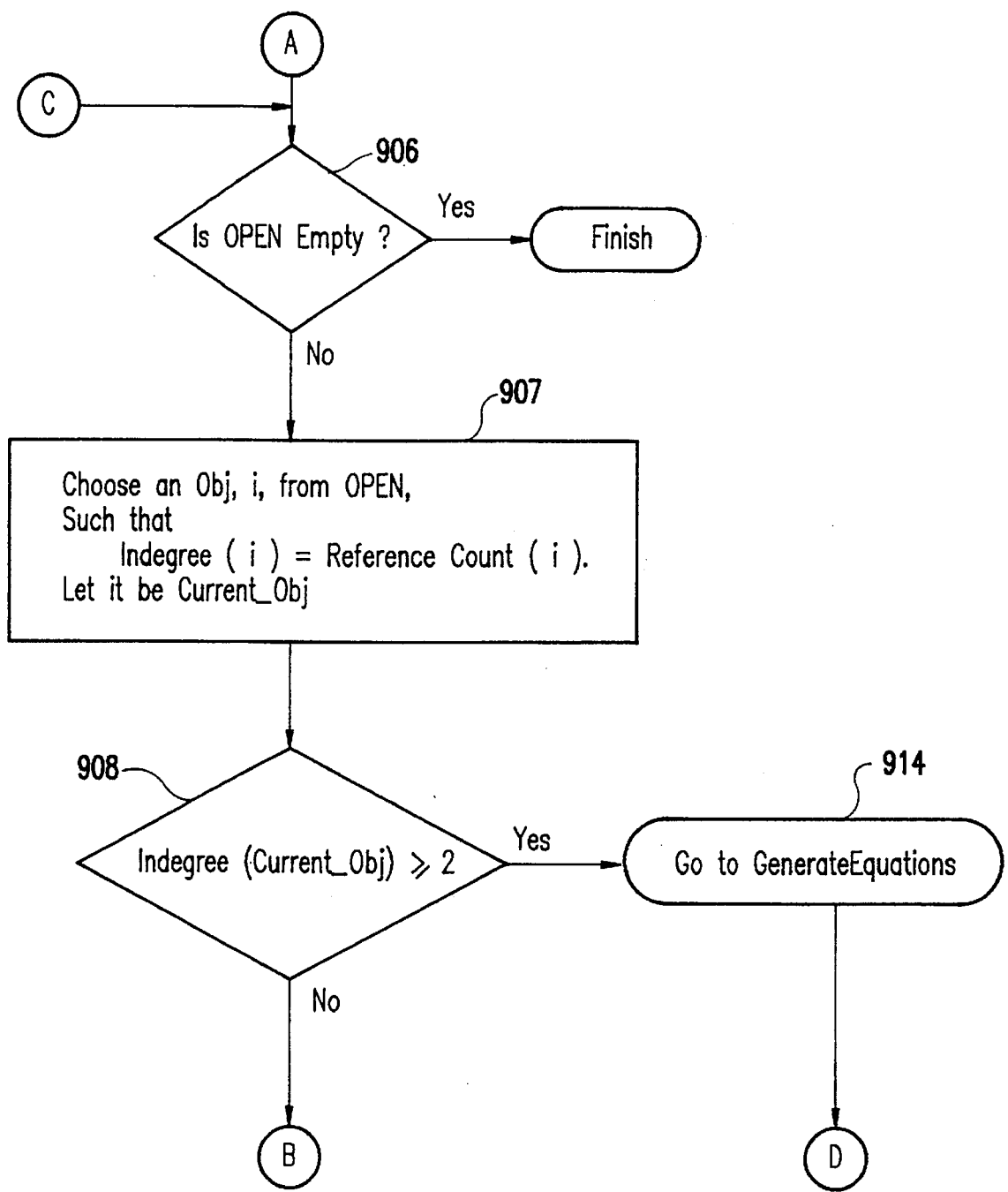
Figure 11C:
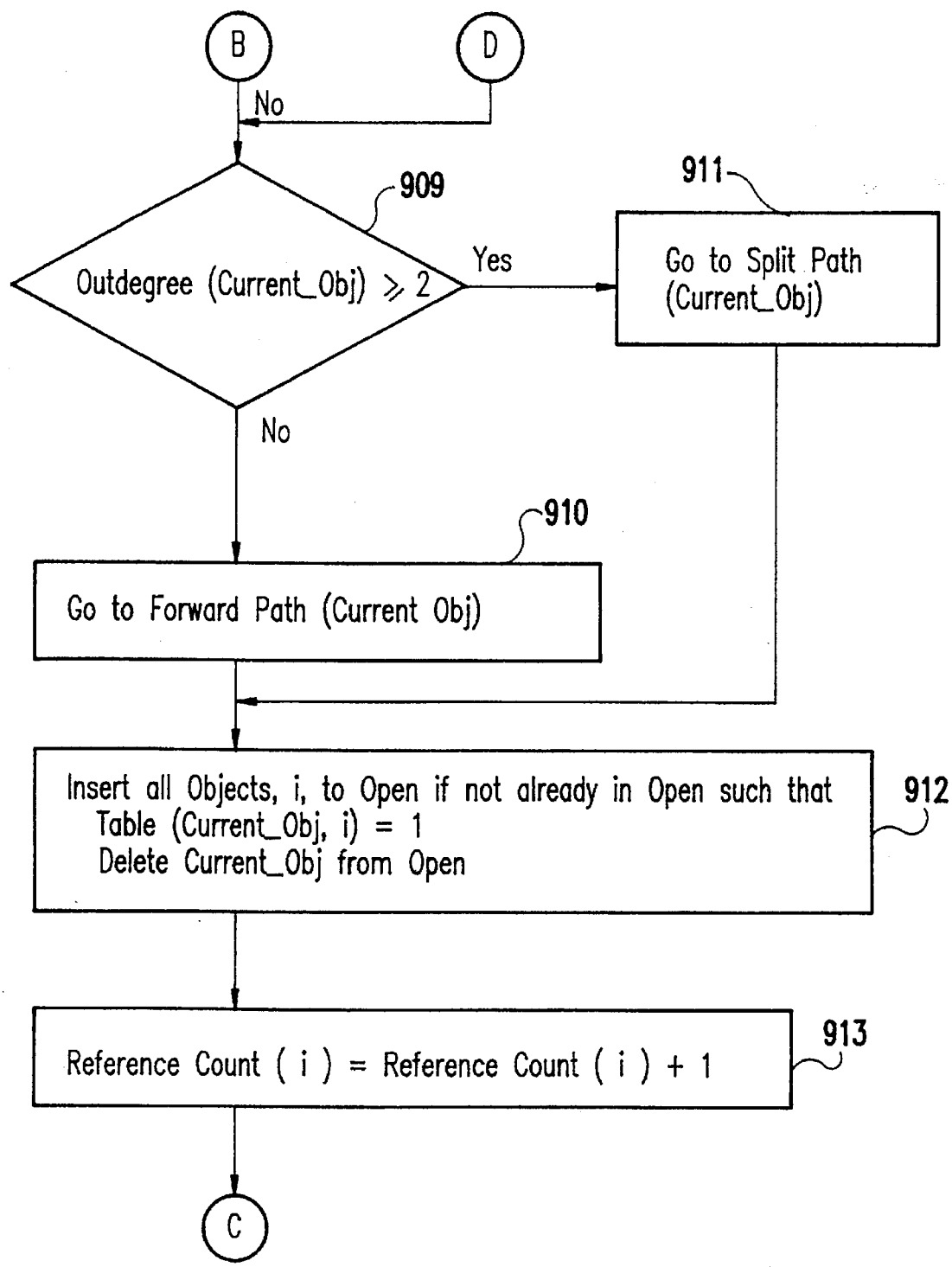

Returning to FIGS. 6B and 6C, the procedure for making the calculations in function blocks 607 and 614 are made according to the procedure shown in the flow chart of FIGS. 11A, 11B and 11C, to which reference is now made. The process of determining constraints of sets of paths with equal play time uses the table shown in FIG. 7. The process is initiated by setting i to "1" in function block 901. A test is then made in decision block 902 to first find if the table entry for the row of the root node, r, and column i is set to "1". If the table entry for row r (root) and column i is zero, i is incremented by 1 in function block 903 and a check is made in decision block 904 to determine if i is less than or equal to N, where N is the number of rows and columns in the table; i.e., the number of nodes in the table. If so, the process lobes back to decision block 901. When i is after the root node r (Table(r,i)=1), the path(i,1) is set to <r>, the reference count(i) is set to 1, and "open" is set to "open" U {i} in function block 905 before again incrementing i in function block 903. Here, the notation path(i) is the set of all paths to node i, and path(i,k) means the kth path to node i; that is, path(i,k) is an element which belongs to path(i).

With the completion of this initial search, the process enters the main loop where in decision block 906 a test is made to determine if "open" is an empty set. If so, the process ends; otherwise, in function block 907 an object, i, is chosen from "open" such that indegree(i) is the reference count(i). The term "indegree" relates to the number of input connections to the object. See FIG. 3C where the dummy node has indegree two. The indegree of node i is the same as the number of "1s" in the column i in the table. The chosen object is the current object. A test is then made in decision block 908 to determine if the indegree of the current object is greater than or equal to two. If not, a further test is made in decision block 909 to determine if the outdegree of the current object is greater than or equal to two. The term "outdegree" relates to the number of output connections from the object. See FIG. 3B where the dummy node has outdegree two. The outdegree of node i is the same as the number of "1s" in the row i in the table. If the outdegree of the current object is less than two, then the procedure forward_path(current_obj) is called in function block 910.

Figure 12:
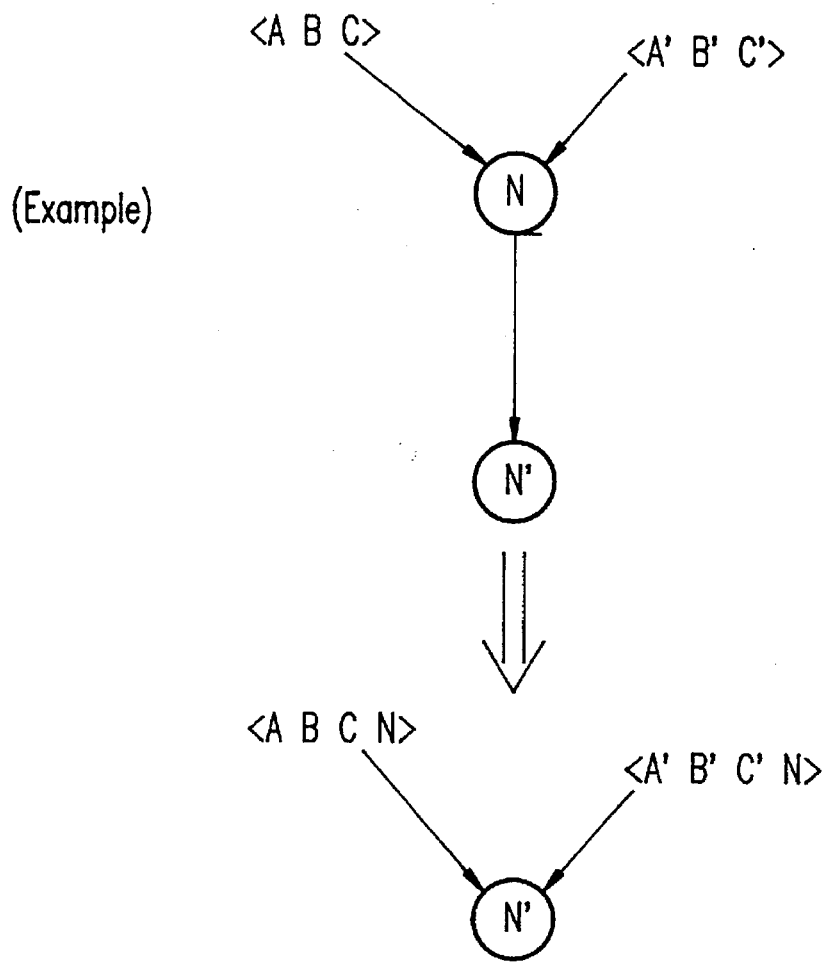
FIG. 12 is a graph showing by example a graphical representation of the process forward_path(current_obj) called from the process of FIG. 11C.
Figure 13:
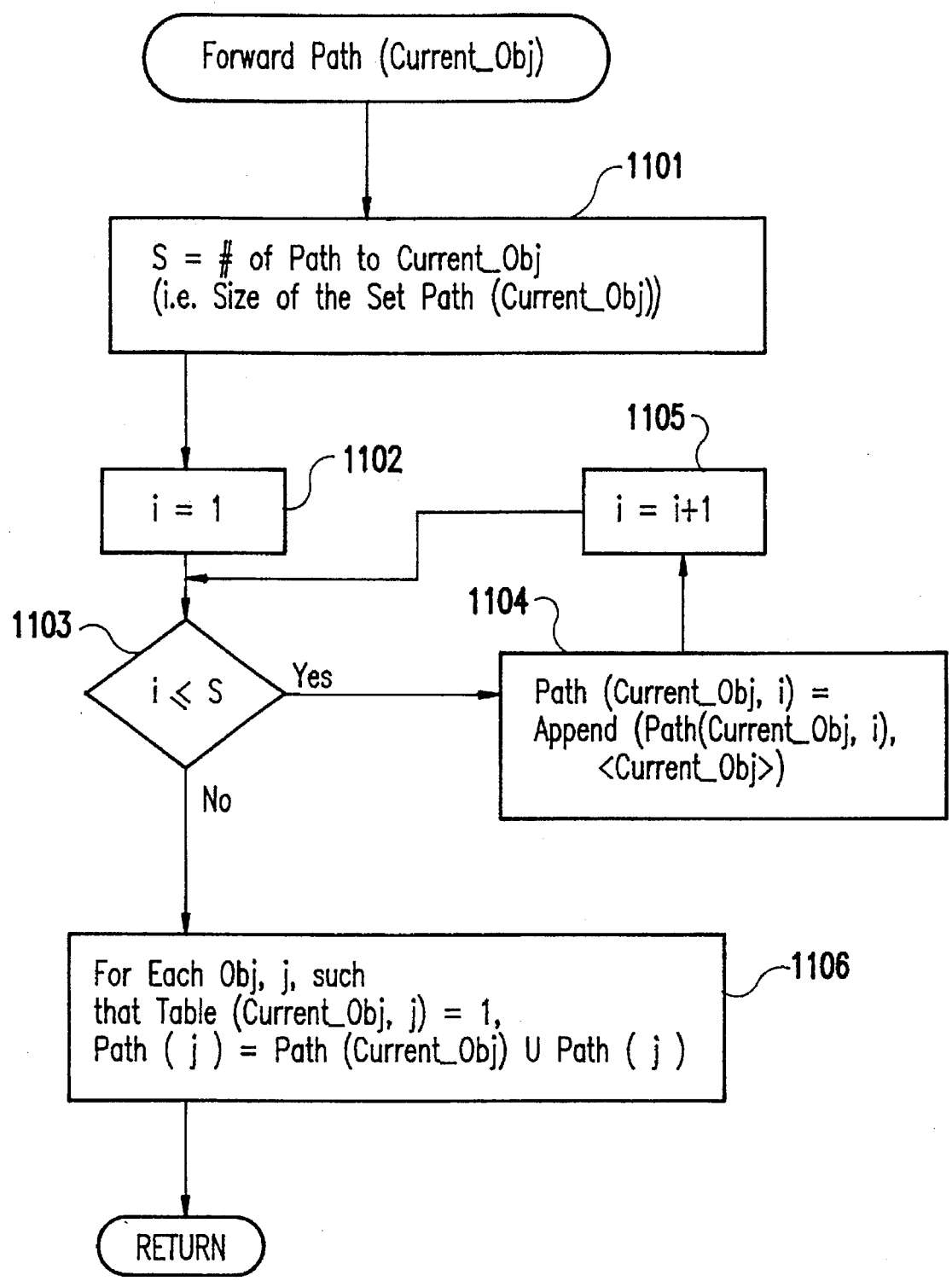
FIG. 13 is a flow chart showing the logic of the process of the procedure forward_path(current_obj)

This procedure is illustrated graphically in FIG. 12 and shown in the flow chart of FIG. 13, to which reference is now made. When the procedure forward_path(current_obj) is called, a variable S is set in function block 1101 to the number of paths to the current object; i.e., the size of the set path(current_obj). In function block 1102, i is initially set to 1, and then in decision block 1103 a test is made to determine if i is less than or equal to S. If so, path(current_obj,i) is set to append (path(current_obj,i), <current_obj>) in function block 1104. The value of i is then incremented in function block 1105, and the process loops back to decision block 1103. When i is greater than S as determined in decision block 1103, path(j) is set to the union of path (current_obj) and path(j) for each object j such that Table (current_obj,j) equals one in function block 1106. At this point a return is made to block 912 in FIG. 11C. In the example shown in FIG. 12, the forward path from node N to N' is reduced by the procedure to the single node N'.

Returning now to FIG. 11C, if in decision block 909 the outdegree of the current object is greater than or equal to two, then the procedure split_path(current_obj) is called in function block 911.

Figure 14:
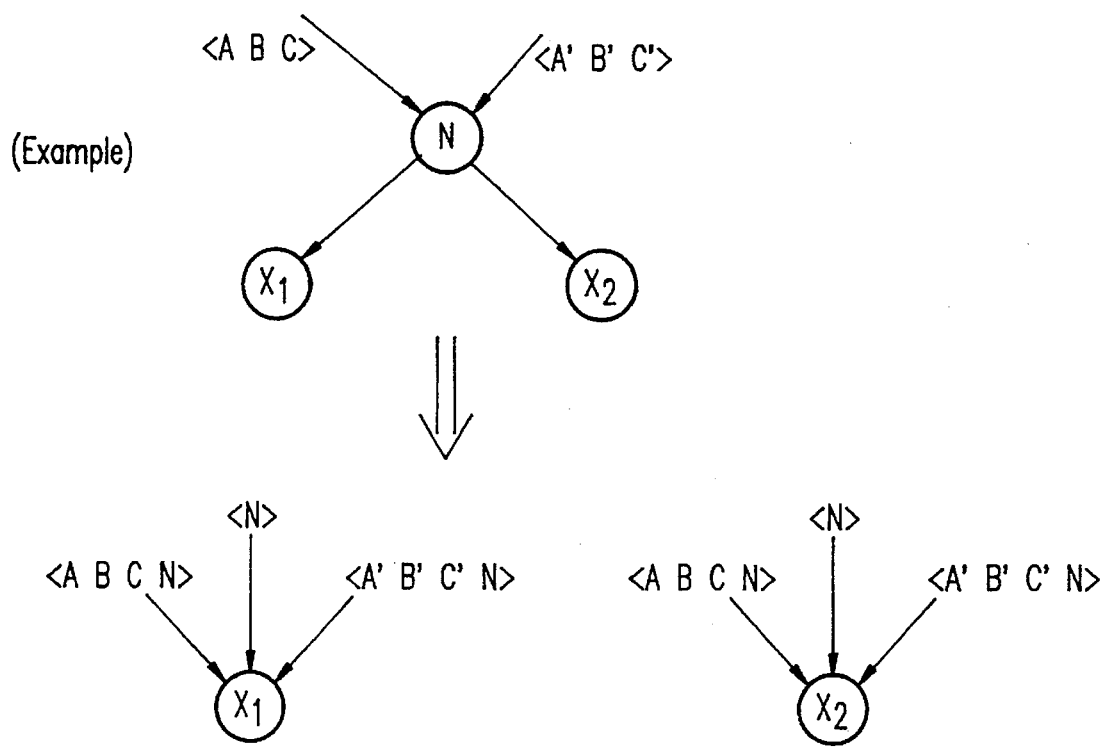
FIG. 14 is a graph showing by example a graphical representation of the process split_path(current_obj) called from the process of FIG. 11C.
Figure 15:
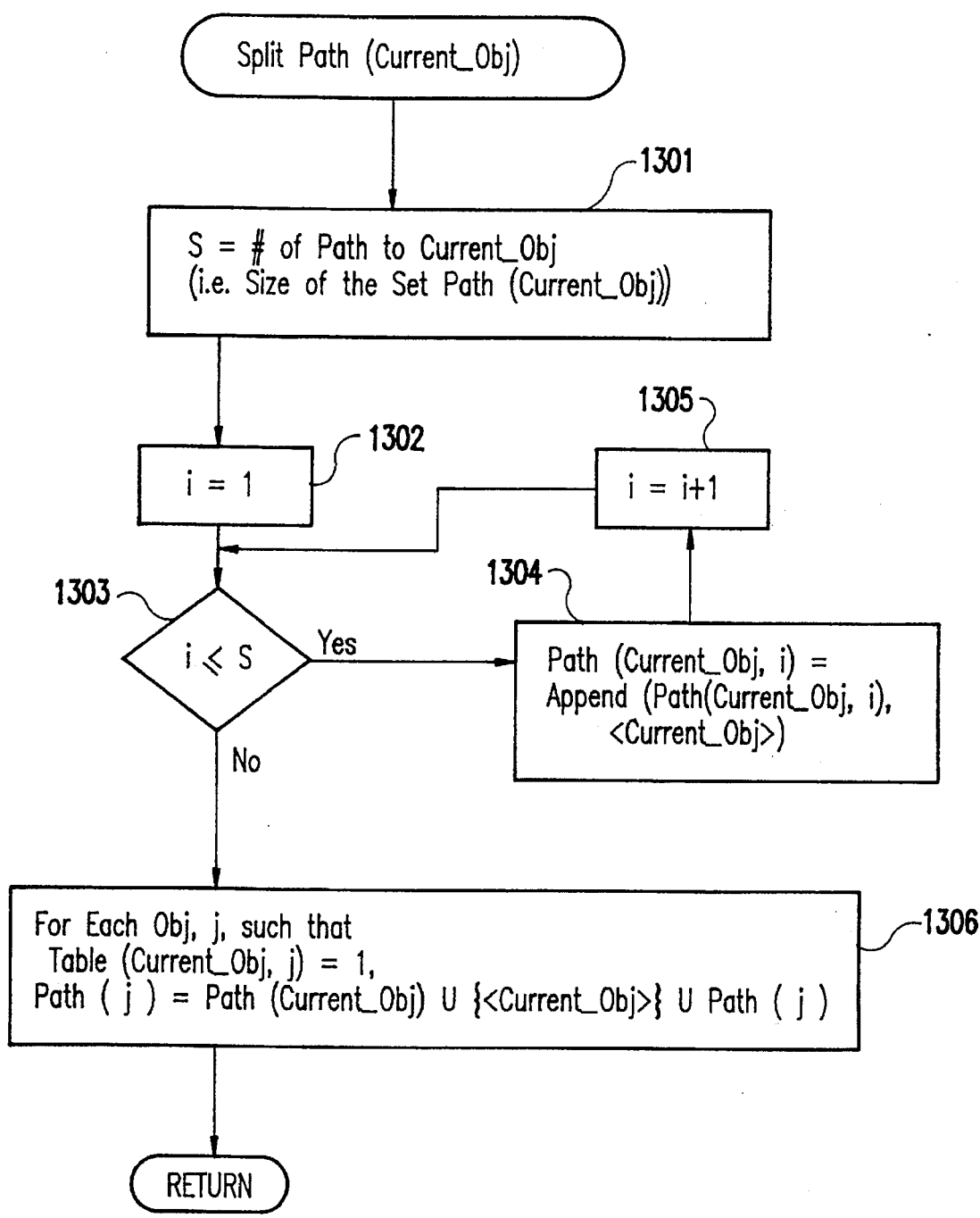
FIG. 15 is a flow chart showing the logic of the process of the procedure split_path(current_obj)

This procedure is illustrated graphically in FIG. 14 and shown in the flow chart of FIG. 15, to which reference is now made. When the procedure split_path(current_obj) is called, the variable S is set in function block 1301 to the number of paths to the current object; i.e., the size of the set path(current_obj). In function block 1302, i is initially set to 1, and then in decision block 1303 a test is made to determine if i is less than or equal to S. If so, path(current_obj,i) is set to append (path(current_obj,i), <current_obj>) in function block 1304. The value of i is then incremented in function block 1305, and the process loops back to decision block 1303. When i is greater than S as determined in decision block 1303, path(j) is set to the union of path(current_obj), path(j), and <current_obj> for each object j such that Table(current_obj,j) equals 1 in function block 1306. At this point a return is made to block 912 in FIG. 11C. In the example shown in the graph of FIG. 14, the paths to nodes $x_1$ and $x_2$ are split into two paths by the procedure.

Returning again to FIG. 11C, when a return is made from either of the procedures in function blocks 910 or 911, all objects i are inserted to "open", if not already in "open", such that Table(current_obj,i) is equal to 1 in function block 912. The current object is deleted from "open", and the reference count(i) is incremented by one in function block 913 before a return is made decision block 906 where, again, "open" is tested to determine whether it is empty. If not, the process repeats the operations of function block 907 and decision block 908. If the indegree of the current object is now found to be greater than or equal to two. The procedure generate_equations(current_obj) is called in function block 914.

Figure 16:
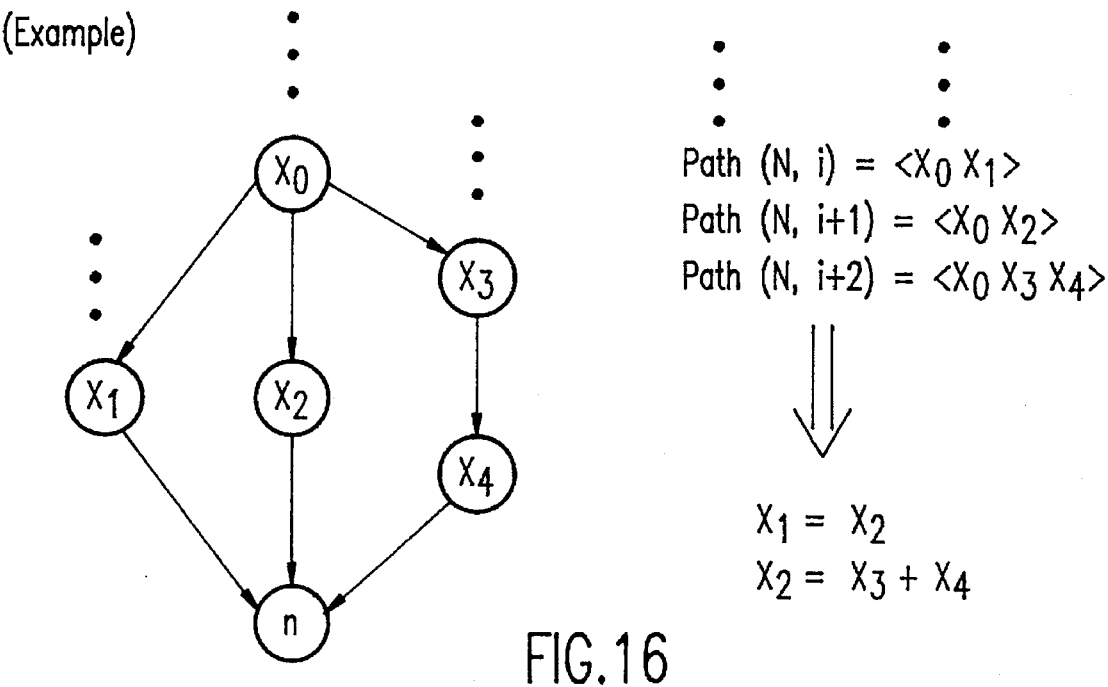
FIG. 16 is a graph showing by example a graphical representation of the process generate_equations(current_obj) called from the process of FIG. 11B.
Figure 17A:
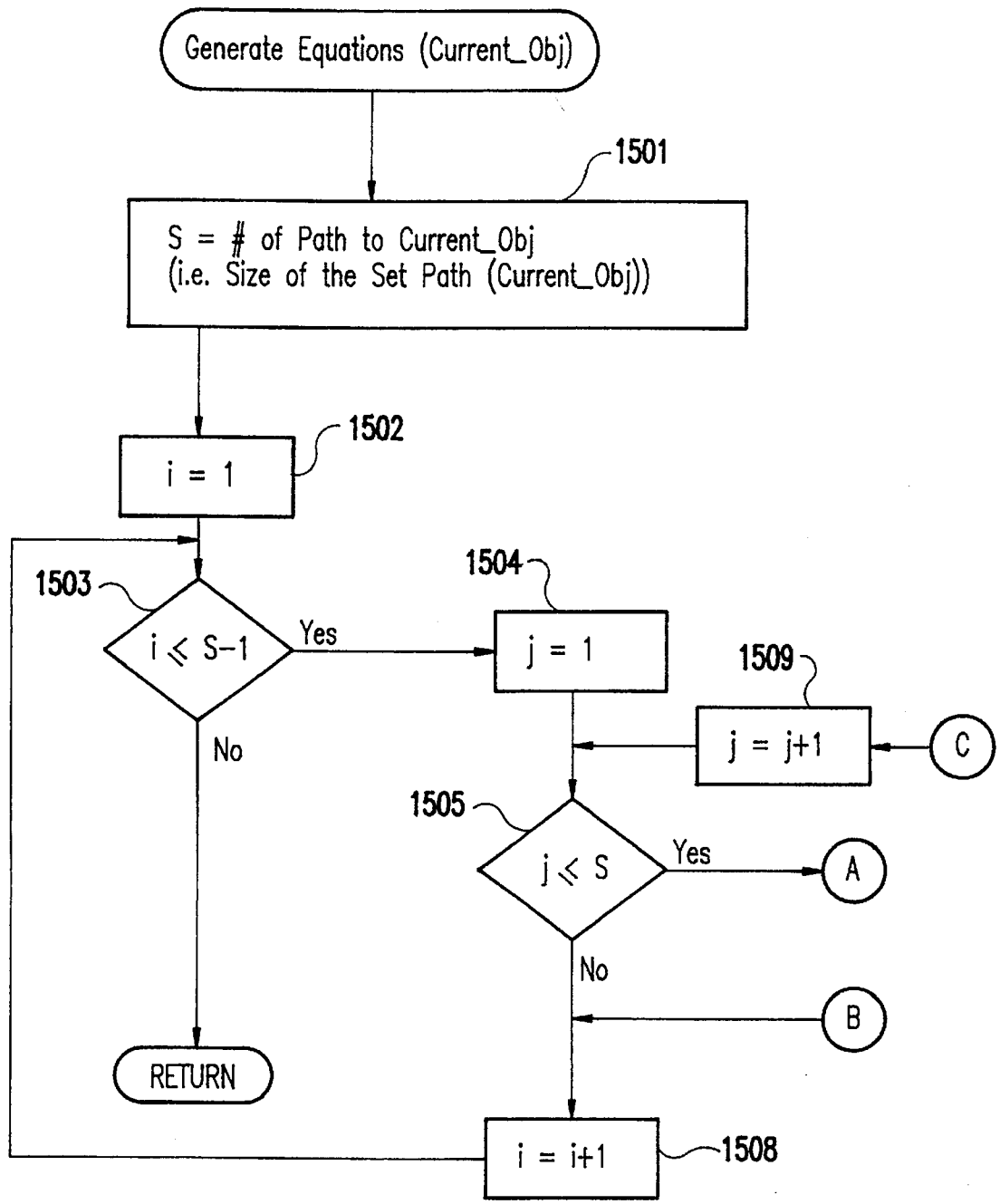
FIGS. 17A and 17B, taken together, are a flow chart showing the logic of the process of the procedure generate_equations(current_obj).
Figure 17B:
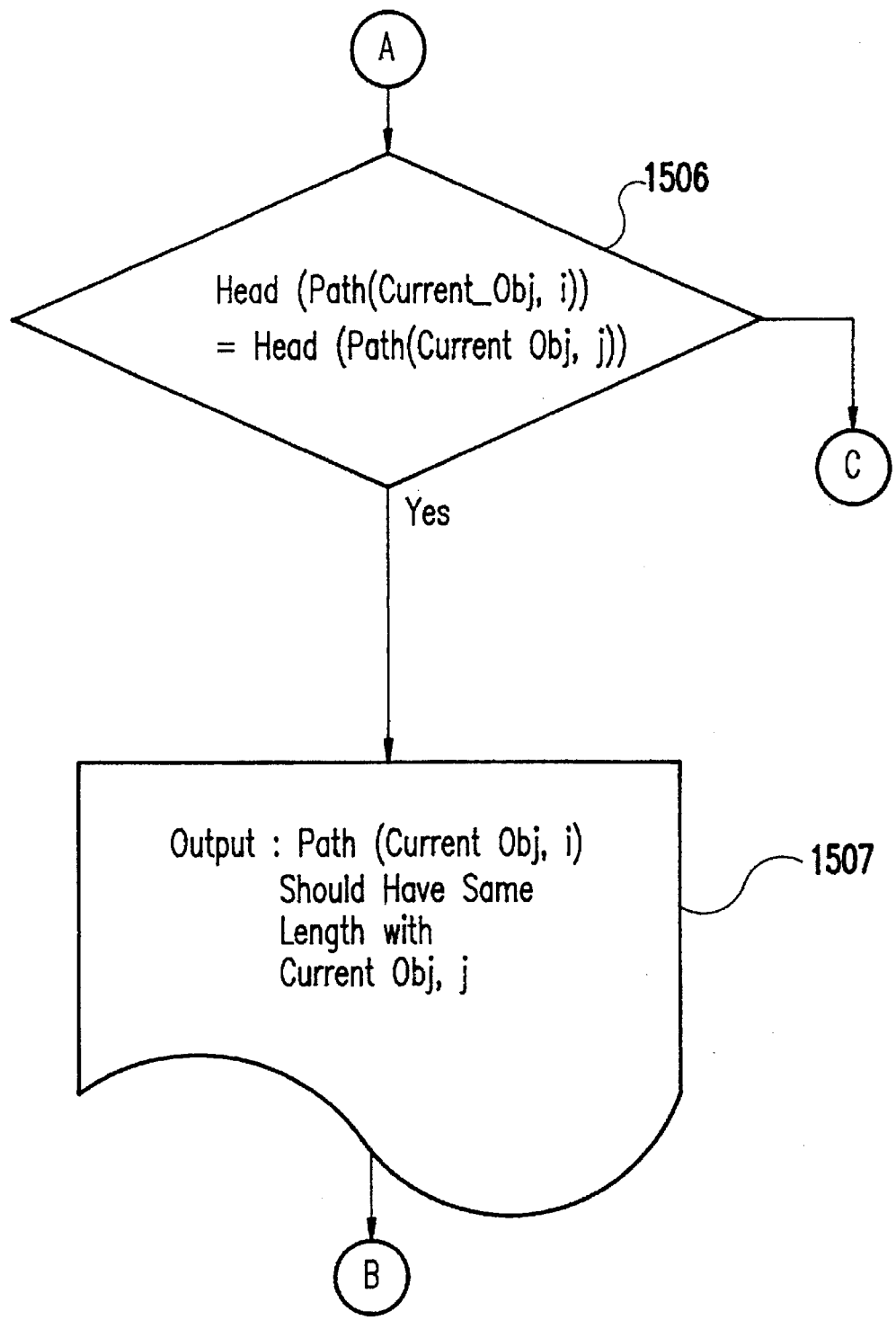

This procedure is illustrated graphically in FIG. 16 and shown in the flow chart of FIGS. 17A and 17B, to which reference is now made. When the procedure generate_equations(current_obj) is called, the variable S is set in function block 1501 to the number of paths to the current object; i.e., the size of the set path(current_obj). In function block 1502, i is initially set to 1, and then in decision block 1503 a test is made to determine if i is less than or equal to S minus 1. If so, j is set to 1 in function block 1504, and a test is then made in decision block 1505 to determine if the value of j is less than or equal to S. If so, a further test is made in decision block 1506 to determine if the head of the path(current_obj,i) is the same as the head of the path (current_obj,j). If so, the path(current_obj,i) is output in output block 1507 as being equal in length to path(current_obj,j). The value of i is incremented in function block 1508 before i is again tested in decision block 1503 to determine if i is less than or equal to S minus one. If the head of the path(current_obj,i) is not the same as the head of the path(current_obj,j), j is incremented by one in function block 1509, and j is again tested to determine if it is less than or equal to S in decision block 1505. When j is greater than S, i is incremented in function block 1508 before i is again tested to determine whether it is less than or equal to S minus one. When i is equal to S, a return is made to the main procedure. In the graphical example illustrated in FIG. 16, the output of output block 1508 is that the path from node $x_0$ to $x_n$ through node $x_1$ is equal to the path through $x_2$. Moreover, the path from $x_0$ to $x_n$ through node $x_2$ is equal to the path through nodes $x_3$ and $x_4$.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of presenting a multimedia story including a plurality of episodes within a global time constraint comprising the steps of:

selecting by a user among a list of episodes which are to compose the multimedia story;

inputting by the user to a computer using an interactive screen a triple composed of minimum, optimum and maximum time durations for each of the selected episodes in multimedia story;

inputting by the user to the computer using an interactive screen temporal constraints of the selected episodes in the multimedia story, the episodes occurring at various times and with differing time durations and the temporal constraints defining episodes that occur sequentially, episodes that begin at a same time, episodes that end at a same time, and episodes that occur simultaneously;

constructing by the computer a temporal constraint table storing the temporal constraints of the selected episodes input by the user;

searching by the computer the temporal constraint table to determine from the temporal constraints sets of paths within the story having equal play time, wherein a path is defined by a node or nodes between common beginning and ending nodes;

searching by the computer for a minimum cost and fair schedule and duration of each episode based on the triples for each episode and the sets of paths within the story having equal play time without regard to a global length constraint;

generating by the computer a global length based on a minimal cost and fair schedule and duration of the episodes in the story;

reporting to the user the global length and minimum cost for the global play time of the multimedia story;

providing the user with an option of accepting or rejecting the generated global length;

outputting by the computer a schedule of episodes for the story if the user accepts the generated global length;

prompting the user to input a global length constraint if the user rejects the generated global length;

adding by the computer the user input global length constraint to the temporal constraint table;

determining by the computer from the temporal constraints sets of paths within the story having equal play time, wherein a path is defined by a node or nodes between common beginning and ending nodes;

searching by the computer for a minimum cost and fair schedule and duration of each episode based on the triples for each episode and the sets of paths within the story having equal play time and within said global constraint; and outputting by the computer a schedule of episodes for the multimedia story after finding a minimum cost and fair schedule within said global constraint.

2. The computer implemented method recited in claim 1 wherein the step of constructing the temporal constraint table comprises the steps of:

initializing a table having n rows and n columns where n is a number of episodes selected by the user;

choosing a pair of episodes related by a temporal constraint;

determining by type whether the chosen temporal constraint is one of episodes that occur sequentially, episodes that begin at a same time, episodes that end at a same time, and episodes that occur simultaneously;

making entries in the table according type of temporal constraint; and repeating the steps of choosing a pair of episodes, determining by type, and making entries in the table until all episodes related by temporal constraint have been processed.

3. The computer implemented method recited in claim 1 wherein the step of inputting by the user to the computer using an interactive screen temporal constraints of the selected episodes in the multimedia story comprises the steps of:

displaying by the computer an area on the screen in which the selected episodes are displayed as icons;

selecting by the user a pair of episodes to be related by temporal constraint;

prompting the user to select by type a temporal constraint as one of episodes that occur sequentially, episodes that begin at a same time, episodes that end at a same time, and episodes that occur simultaneously; and repeating the steps of selecting and prompting until all episodes are related temporally.

* * * * *